(12) United States Patent
Kawakami

(10) Patent No.: US 11,635,947 B2
(45) Date of Patent: Apr. 25, 2023

(54) INSTRUCTION TRANSLATION SUPPORT METHOD AND INFORMATION PROCESSING APPARATUS

(71) Applicant: FUJITSU LIMITED, Kawasaki (JP)

(72) Inventor: Kentaro Kawakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/389,412

(22) Filed: Jul. 30, 2021

(65) Prior Publication Data
US 2021/0373859 A1 Dec. 2, 2021

Related U.S. Application Data

(63) Continuation-in-part of application No. 17/177,246, filed on Feb. 17, 2021, now Pat. No. 11,556,317.

(30) Foreign Application Priority Data

May 22, 2020 (JP) .............................. JP2020-090112
Apr. 26, 2021 (JP) .............................. JP2021-074348

(51) Int. Cl.
*G06F 8/40* (2018.01)
*G06F 9/30* (2018.01)

(52) U.S. Cl.
CPC ............ *G06F 8/40* (2013.01); *G06F 9/30174* (2013.01)

(58) Field of Classification Search
CPC ..... G06F 8/40; G06F 8/41; G06F 8/51; G06F 8/441; G06F 8/443; G06F 8/451;
(Continued)

(56) References Cited

U.S. PATENT DOCUMENTS

| 5,745,723 A * | 4/1998 | Matsuo .............. G06F 9/30149 714/E11.21 |
| 11,113,052 B2 * | 9/2021 | Muramatsu ......... G06F 9/30018 |
| 2004/0243983 A1 | 12/2004 | Kumura |
| 2005/0015781 A1 | 1/2005 | Brown et al. |
| 2008/0250231 A1 | 10/2008 | Tagawa et al. |

(Continued)

FOREIGN PATENT DOCUMENTS

| JP | H07-210397 A | 8/1995 |
| JP | 2008-276735 A | 11/2008 |

(Continued)

OTHER PUBLICATIONS

U.S. Office Action dated Jul. 6, 2022 for copending U.S. Appl. No. 17/177,246, 15 pages.
U.S. Office Action dated Mar. 2, 2022 for copending U.S. Patent Application No. 17/177,246, 17 pages.

(Continued)

*Primary Examiner* — Hanh Thi-Minh Bui
(74) *Attorney, Agent, or Firm* — Fujitsu Patent Center

(57) ABSTRACT

A process includes receiving a table data set that represents mappings between a plurality of operand patterns indicating types of operands possibly included in a first instruction used in a first assembly language and a plurality of second instructions used in a second assembly language or a machine language corresponding to the second assembly language. The table data set maps two or more of the second instructions to each of the operand patterns. The process also includes generating, based on the table data set, a translation program used to translate first code written in the first assembly language into second code written in the second assembly language or the machine language. The translation program defines a process of determining an operand pattern of an instruction included in the first code and outputting two or more instructions of the second code according to the determined operand pattern.

13 Claims, 30 Drawing Sheets

(58) Field of Classification Search
CPC .............. G06F 8/452; G06F 9/30; G06F 9/35; G06F 9/30007; G06F 12/0207; G06F 12/0292
See application file for complete search history.

(56) References Cited

U.S. PATENT DOCUMENTS

| | | |
|---|---|---|
| 2014/0047222 A1 | 2/2014 | Wang |
| 2014/0181476 A1 | 6/2014 | Srinivasan et al. |
| 2017/0337060 A1* | 11/2017 | Yamanaka ................ G06F 8/45 |
| 2021/0173893 A1* | 6/2021 | Luo .................... G11C 13/0069 |

FOREIGN PATENT DOCUMENTS

| | | |
|---|---|---|
| JP | 2011-123917 A | 6/2011 |
| JP | 2014-515858 A | 7/2014 |
| WO | 2012/145917 A1 | 11/2012 |

OTHER PUBLICATIONS

U.S. Notice of Allowance dated Sep. 16, 2022 for co-pending U.S. Patent Application No. 17/177,246, 10 pages.
Bezzubikov, Aleksandr et al., "Automatic Dynamic Binary Translator Generation from Instruction Set Description,", 2017 Ivannikov ISPRAS Open Conference (ISPRAS), pp. 27-33, 2017.
Cempron, Jonathan Paul et al., "A Static Transliteration Approach for Assembly Language Translation," pp. 332-336, 2016 IEEE Region 10 Symposium (TENSYMP).
U.S. Notice of Allowance dated Nov. 18, 2022 for corresponding U.S. Appl. No. 17/177,246, 11 pages.

* cited by examiner

TRANSLATION PROGRAM ╱─ 143

```
mn = decodeMnemonic(line);
operands = decodeOperands(line);

switch(mn) {
   case "add":      translateADD(operands); break;
   case "sub":      translateSUB(operands); break;
   case "vpmaxsd":  translateVPMAXSD(operands); break;
   case  ...
}
```

| # | Instruction | opName0 | opName1 | opName2 | opName3 | opWidth0 | Pred | EVEX.b | XT_UNIMPLEMENTED; | pTmpIdx = xt.push_preg(&a64); | zTmpIdx = xt.push_zreg(&a64); | maskIdx = a64.operands[1].regIdx; | CG64::movs(xa::PRegB(pTmpIdx), P_ALL_ONEb); | CG64::ldr(xa::ZReg(zTmpIdx), xa::ptr(X_TMP_ADDR)); | CG64::ld1rw(xa::ZRegZ(zTmpIdx,s,xa::PRegB)/xa::ptr(X_TMP_ADDR)); | dstIdx = a64.operands[0].regIdx; |
|---|---|---|---|---|---|---|---|---|---|---|---|---|---|---|---|---|
| 1 | VPMAXSD xmm1, xmm2, xmm3/m128 | REG0 | REG1 | REG2 | INVALID | 128 | | | 1 | 1 | 1 | | | | | 1 |
| 2 | | REG0 | REG1 | MEM0 | INVALID | 128 | | | 1 | 1 | 1 | | | 1 | 1 | 1 |
| 3 | VPMAXSD ymm1, ymm2, ymm3/m256 | REG0 | REG1 | REG2 | INVALID | 256 | | | 1 | 1 | 1 | | | | | 1 |
| 4 | | REG0 | REG1 | MEM0 | INVALID | 256 | | | 1 | 1 | 1 | | | 1 | 1 | 1 |
| 5 | VPMAXSD xmm1 {k1}{z}, xmm2, xmm3/m128/m32bcst | REG0 | REG1 | REG2 | REG3 | 128 | NO | 0 | 1 | 1 | 1 | 1 | | | | 1 |
| 6 | | REG0 | REG1 | REG2 | MEM0 | 128 | NO | 1 | 1 | 1 | 1 | 1 | | | | 1 |
| 7 | | REG0 | REG1 | REG2 | MEM0 | 128 | NO | 0 | 1 | 1 | 1 | 1 | | | 1 | 1 |
| 8 | | REG0 | REG1 | REG2 | REG3 | 128 | ZERO | 0 | 1 | 1 | 1 | 1 | 1 | | | 1 |
| 9 | | REG0 | REG1 | REG2 | MEM0 | 128 | ZERO | 1 | 1 | 1 | 1 | 1 | 1 | | | 1 |
| 10 | | REG0 | REG1 | REG2 | MEM0 | 128 | ZERO | 0 | 1 | 1 | 1 | 1 | 1 | | 1 | 1 |
| 11 | | REG0 | REG1 | REG2 | REG3 | 128 | MERG | 0 | 1 | 1 | 1 | 1 | 1 | | | 1 |

144

| # | AE srcIdx = a64.operands[2].regIdx | AF src2Idx = a64.operands[3].regIdx | AG srcIdx = a64.operands[1].regIdx | AH src2Idx = a64.operands[2].regIdx | AI src2Idx = zTmpIdx | AJ CG64::movs(xa::PRegB(pTmpIdx), P_ALL_ONE.b); | AK CG64::not_(xa::PRegB(pTmpIdx), P_ALL_ONE.b, P_MSB_384.b); | AN CG64::cmple(P_TMP_0.s, xa::PReg(pTmpIdx)/xa::T_z, xa::ZReg(srcIdx).s, xa::ZReg(src2Idx).s); | AO CG64::cmpgt(P_TMP_1.s, xa::PReg(pTmpIdx)/xa::T_z, xa::ZReg(srcIdx).s, xa::ZReg(src2Idx).s); | AP CG64::bic(xa::PReg(pTmpIdx).b, P_ALL_ONE/xa::T_z, xa::PReg(maskIdx).b, P_TMP_0.b); | AS CG64::mov(xa::ZReg(dstIdx).s, xa::PReg(pTmpIdx)/xa::T_m, xa::ZReg(src2Idx).s); | AT CG64::mov(xa::ZReg(zTmpIdx).s, P_TMP_0/xa::T_m, xa::ZReg(src2Idx).s); | AU CG64::mov(xa::ZReg(dstIdx).s, P_TMP_0/xa::T_m, xa::ZReg(src2Idx).s); | AW CG64::not_(P_TMP_0.b, P_ALL_ONE, P_TMP_0.b); | AX CG64::bic(xa::PReg(pTmpIdx).b, P_ALL_ONE/xa::T_z, xa::PReg(maskIdx).b, P_TMP_1.b); | AY CG64::mov(xa::ZReg(dstIdx).s, P_TMP_1/xa::T_m, xa::ZReg(srcIdx).s); | AZ CG64::mov(xa::ZReg(dstIdx).s, P_TMP_0/xa::T_m, xa::ZReg(srcIdx).s); | BA CG64::mov(xa::ZReg(zTmpIdx).s, xa::PReg(pTmpIdx)/xa::T_m, xa::ZReg(srcIdx).s); | BB CG64::mov(xa::ZReg(dstIdx).s, xa::PReg(maskIdx)/xa::T_m, xa::ZReg(zTmpIdx).s); | BC CG64::mov(xa::ZReg(dstIdx).s, P_MSB_384/xa::T_m, 0); | BD CG64::mov(xa::ZReg(dstIdx).s, P_MSB_256/xa::T_m, 0); | BE CG64::not_(xa::PReg(pTmpIdx), P_ALL_ONE.xa::PReg(maskIdx)); | BF CG64::mov(xa::ZReg(dstIdx).s, xa::PReg(pTmpIdx)/xa::T_m, 0); | BG CG64::mov(xa::ZReg(dstIdx).s, P_MSB_384/xa::T_m, 0); | BH CG64::mov(xa::ZReg(dstIdx).s, P_MSB_256/xa::T_m, 0); | BI xt_pop_zreg(); | BJ xt_pop_preg(); | BK XT VALID CHECK. |
|---|---|---|---|---|---|---|---|---|---|---|---|---|---|---|---|---|---|---|---|---|---|---|---|---|---|---|---|---|
| 1 |   |   | 1 |   |   |   |   | 1 | 1 |   |   |   | 1 |   |   |   | 1 |   |   |   | 1 |   |   |   |   | 1 | 1 | 1 |
| 2 |   |   | 1 | 1 |   |   |   | 1 |   |   |   |   | 1 |   |   |   |   |   |   |   | 1 |   |   |   |   | 1 | 1 | 1 |
| 3 |   |   | 1 |   |   |   |   | 1 | 1 |   |   |   | 1 |   |   |   | 1 |   |   |   |   | 1 |   |   |   | 1 | 1 | 1 |
| 4 |   |   | 1 | 1 |   |   |   |   |   |   |   |   | 1 |   |   |   |   |   |   |   |   | 1 |   |   |   |   | 1 | 1 |
| 5 | 1 |   |   |   |   | 1 | 1 | 1 | 1 |   |   |   | 1 |   |   |   |   |   |   |   |   |   |   |   |   |   | 1 | 1 |
| 6 | 1 |   |   |   | 1 | 1 |   | 1 | 1 |   |   |   | 1 |   |   |   | 1 |   |   |   |   |   | 1 |   |   |   | 1 | 1 |
| 7 | 1 | 1 |   |   | 1 | 1 |   | 1 | 1 |   |   |   | 1 |   |   |   | 1 |   |   |   |   |   | 1 |   |   |   | 1 | 1 |
| 8 | 1 |   |   |   | 1 |   |   | 1 | 1 |   |   |   | 1 |   |   |   | 1 |   |   |   |   |   |   | 1 |   |   | 1 | 1 |
| 9 | 1 | 1 |   |   | 1 |   |   | 1 | 1 |   |   |   | 1 |   |   |   | 1 |   |   |   |   |   |   | 1 |   |   | 1 | 1 |
| 10 | 1 |   |   |   | 1 |   |   | 1 | 1 |   |   |   | 1 |   |   |   | 1 |   |   |   |   |   |   | 1 |   |   | 1 | 1 |
| 11 | 1 | 1 |   |   | 1 |   |   | 1 | 1 |   |   | 1 |   |   |   |   | 1 |   | 1 | 1 |   |   |   | 1 |   |   | 1 | 1 |

| B | E | F | G | H | I | N | O | P | T | U | W | Y | Z | AA | AB | AD |
|---|---|---|---|---|---|---|---|---|---|---|---|---|---|---|---|---|
| 12 | VPMAXSD xmm1{k1}{z}, xmm2, xmm3/m128/m32bcst | REG0 | REG1 | REG2 | MEM0 | 128 | MERG | 0 | 1 | 1 | 1 |  |  |  |  | 1 |
| 13 |  | REG0 | REG1 | REG2 | MEM0 | 128 | MERG | 1 | 1 | 1 | 1 |  |  |  | 1 | 1 |
| 14 |  | REG0 | REG1 | REG2 | REG3 | 256 | NO | 0 |  |  |  |  | 1 |  |  | 1 |
| 15 | VPMAXSD ymm1{k1}{z}, ymm2, ymm3/m256/m32bcst | REG0 | REG1 | REG2 | MEM0 | 256 | NO | 0 | 1 |  |  |  |  |  |  |  |
| 16 |  | REG0 | REG1 | REG2 | MEM0 | 256 | NO | 1 | 1 |  |  |  |  |  |  |  |
| 17 |  | REG0 | REG1 | REG2 | REG3 | 256 | ZERO | 0 | 1 |  |  |  |  |  |  |  |
| 18 |  | REG0 | REG1 | REG2 | MEM0 | 256 | ZERO | 1 | 1 |  |  |  |  |  |  |  |
| 19 |  | REG0 | REG1 | REG2 | MEM0 | 256 | ZERO | 0 | 1 |  |  |  |  |  |  |  |
| 20 |  | REG0 | REG1 | REG2 | REG3 | 256 | MERG | 1 | 1 |  |  |  |  |  |  |  |
| 21 |  | REG0 | REG1 | REG2 | MEM0 | 256 | MERG | 0 | 1 |  |  |  |  |  |  |  |
| 22 |  | REG0 | REG1 | REG2 | MEM0 | 256 | MERG | 1 |  |  |  |  |  |  |  |  |
| 23 | VPMAXSD zmm1{k1}{z}, zmm2, zmm3/m512/m32bcst | REG0 | REG1 | REG2 | REG3 | 512 | NO | 0 | 1 | 1 | 1 |  |  | 1 |  | 1 |
| 24 |  | REG0 | REG1 | REG2 | MEM0 | 512 | NO | 1 | 1 | 1 | 1 | 1 |  |  |  | 1 |
| 25 |  | REG0 | REG1 | REG2 | MEM0 | 512 | NO | 0 | 1 | 1 | 1 |  | 1 |  |  | 1 |
| 26 |  | REG0 | REG1 | REG2 | REG3 | 512 | ZERO | 1 | 1 | 1 | 1 |  |  | 1 |  | 1 |
| 27 |  | REG0 | REG1 | REG2 | MEM0 | 512 | ZERO | 0 | 1 | 1 | 1 |  | 1 |  |  | 1 |
| 28 |  | REG0 | REG1 | REG2 | MEM0 | 512 | ZERO | 1 | 1 | 1 | 1 |  |  | 1 |  | 1 |
| 29 |  | REG0 | REG1 | REG2 | MEM0 | 512 | MERG | 0 | 1 | 1 | 1 |  | 1 |  |  | 1 |
| 30 |  | REG0 | REG1 | REG2 | MEM0 | 512 | MERG | 1 | 1 | 1 | 1 |  |  | 1 |  | 1 |
| 31 |  | REG0 | REG1 | REG2 | MEM0 | 512 | MERG |  | 1 | 1 | 1 |  | 1 |  |  | 1 |

TRANSLATION FUNCTION PROGRAM — 145

```
translateVPMAXSD(operands) { if (opName0==REG0 && opName1==REG1 && opName2==REG2
      && opName3==INVALID && opWidth0==128 && true) {
    pTmpIdx = xt_push_preg(&a64);
    dstIdx = a64.operands[0].regIdx;
    srcIdx = a64.operands[1].regIdx;
    src2Idx = a64.operands[2].regIdx;
    CG64::not_(xa::PRegB(pTmpIdx), P_ALL_ONE, P_MSB_384.b);
    CG64::cmple(P_TMP_0.s, xa::PReg(pTmpIdx)/xa::T_z,
                          xa::ZReg(srcIdx).s, xa::ZReg(src2Idx).s);
    CG64::cmpgt(P_TMP_1.s, xa::PReg(pTmpIdx)/xa::T_z,
                          xa::ZReg(srcIdx).s, xa::ZReg(src2Idx).s);
    CG64::mov(xa::ZReg(dstIdx).s, P_TMP_0/xa::T_m, xa::ZReg(src2Idx).s);
    CG64::mov(xa::ZReg(dstIdx).s, P_TMP_1/xa::T_m, xa::ZReg(srcIdx).s);
    CG64::mov(xa::ZReg(dstIdx).s, P_MST_384/xa::T_m, 0);
    xt_pop_preg();
    XT_VALID_CHECK;

} else if (opName0==REG0 && opName1==REG1 && opName2==MEM0
      && opName3==INVALID && opWidth0==128 && true) {
    XT_UNIMPLEMENTED;
    pTmpIdx = xt_push_preg(&a64);
    zTmpIdx = xt_push_zreg(&a64);
    CG64::ldr(xa::ZReg(zTmpIdx), xa::ptr(X_TMP_ADDR));
    dstIdx = a64.operands[0].regIdx;
    srcIdx = a64.operands[1].regIdx;
    src2Idx = zTmpIdx;
    CG64::not_(xa::PRegB(pTmpIdx), P_ALL_ONE, P_MSB_384.b);
    CG64::cmple(P_TMP_0.s, xa::PReg(pTmpIdx)/xa::T_z,
                          xa::ZReg(srcIdx).s, xa::ZReg(src2Idx).s);
    CG64::mov(xa::ZReg(dstIdx).s, P_TMP_0/xa::T_m, xa::ZReg(src2Idx).s);
    CG64::not_(P_TMP_0.b, P_ALL_ONE, P_TMP_0.b);
    CG64::mov(xa::ZReg(dstIdx).s, P_TMP_0/xa::T_m, xa::ZReg(srcIdx).s);
    CG64::mov(xa::ZReg(dstIdx).s, P_MSB_384/xa::T_m, 0);
    xt_pop_zreg();
    xt_pop_preg();
    XT_VALID_CHECK;

} else if (···) {
    ...
  }
}
```

- 145a: first if-block
- 145b: else if-block

FIG. 11

| B | E | Q |
|---|---|---|
| 1 | VPMAXSD xmm1, xmm2, xmm3/m128 | pTmpIdx = xt_push_preg(&a64);<br>dstIdx = a64.operands[0].regIdx;<br>srcIdx = a64.operands[1].regIdx;<br>src2Idx = a64.operands[2].regIdx;<br>CG64::not_(xa::PRegB(pTmpIdx), P_ALL_ONE, P_MSB_384.b);<br>CG64::cmple(P_TMP_0.s, xa::PReg(pTmpIdx)/xa::T_z,xa::ZReg<br>CG64::cmpgt(P_TMP_1.s, xa::PReg(pTmpIdx)/xa::T_z, xa::ZRe<br>CG64::mov(xa::ZReg(dstIdx).s, P_TMP_0/xa::T_m, xa::ZReg(sr<br>CG64::mov(xa::ZReg(dstIdx).s, P_TMP_1/xa::T_m, xa::ZReg(sr<br>CG64::mov(xa::ZReg(dstIdx).s, P_MST_384/xa::T_m, 0);<br>xt_pop_preg();<br>XT_VALID_CHECK; |
| 2 |  | XT_UNIMPLEMENTED;<br>pTmpIdx = xt_push_preg(&a64);<br>zTmpIdx = xt_push_zreg(&a64);<br>CG64::ldr(xa::ZReg(zTmpIdx), xa::ptr(X_TMP_ADDR));<br>dstIdx = a64.operands[0].regIdx;<br>srcIdx = a64.operands[1].regIdx;<br>src2Idx = zTmpIdx;<br>CG64::not_(xa::PRegB(pTmpIdx), P_ALL_ONE, P_MSB_384.b);<br>CG64::cmple(P_TMP_0.s, xa::PReg(pTmpIdx)/xa::T_z, xa::ZReg<br>CG64::mov(xa::ZReg(dstIdx).s, P_TMP_0/xa::T_m, xa::ZReg(sr<br>CG64::not_(P_TMP_0.b, P_ALL_ONE, P_TMP_0.b);<br>CG64::mov(xa::ZReg(dstIdx).s, P_TMP_0/xa::T_m, xa::ZReg(sr<br>CG64::mov(xa::ZReg(dstIdx).s, P_MSB_384/xa::T_m, 0);<br>xt_pop_zreg();<br>xt_pop_preg();<br>XT_VALID_CHECK; |
| ... | ... | ... |

FIG. 12

TRANSLATION FUNCTION PROGRAM  ⟋ 146

```
translateVPMAXSD(operands) { if ((opName0==REG0 && opName1==REG1 && opName2==MEM0
            && opName3==INVALID && opWidth0==128)
     || (opName0==REG0 && opName1==REG1 && opName2==MEM0
            && opName3==INVALID && opWidth0==256)
     || (···)) {
       XT_UNIMPLEMENTED;
    } if ((opName0==REG0 && opName1==REG1 && opName2==REG2
            && opName3==INVALID && opWidth0==128)
     || (opName0==REG0 && opName1==REG1 && opName2==MEM0
            && opName3==INVALID && opWidth0==128)
     || (opName0==REG0 && opName1==REG1 && opName2==REG2
            && opName3==INVALID && opWidth0==256)
     || (opName0==REG0 && opName1==REG1 && opName2==MEM0
            && opName3==INVALID && opWidth0==256)
     || (···)) {
       pTmpIdx = xt_push_preg(&a64);
    }

...
}
```

146a: first if-block
146b: second if-block

| INSTRUCTION SET I | INSTRUCTION SET A (512 bits) | INSTRUCTION SET A (256 bits) | INSTRUCTION SET A (128 bits/NO SUPPORT) |
|---|---|---|---|
| vaddps xmm0, xmm1, xmm2 | fadd v0, v1, v2 | fadd v0, v1, v2 | fadd v0, v1, v2 |
| vaddps xmm0, xmm1, [addr_reg] | sub sp, sp, 64<br>str z31, [sp]<br>ld1 v31.s4, [addr_reg]<br>fadd v0, v1, v31<br>ldr z31, [sp]<br>add sp, sp, 64 | sub sp, sp, 32<br>str z31, [sp]<br>ldr v31.s4, [addr_reg]<br>fadd v0, v1, v31<br>ldr z31, [sp]<br>add sp, sp, 32 | sub sp, sp, 16<br>str v31, [sp]<br>ldr v31.s4, [addr_reg]<br>fadd v0, v1, v31<br>ldr v31, [sp]<br>add sp, sp, 16 |
| vaddps ymm0, ymm1, ymm2 | fadd z0, z1, z2<br>mov z0, p7.s/m, 0 | fadd z0, z1, z2 | N/A |
| vaddps ymm0, ymm1, [addr_reg] | sub sp, sp, 64<br>str z31, [sp]<br>ld1w z31.s, p7/Z, [addr_reg]<br>fadd z0, z1, z31<br>mov z0, p7.s/m, 0<br>ldr z31, [sp]<br>add sp, sp, 64 | sub sp, sp, 32<br>str z31, [sp]<br>ld1w z31.s, p7/Z, [addr_reg]<br>fadd z0, z1, z31<br>ldr z31, [sp]<br>add sp, sp, 32 | N/A |
| vaddps zmm0, zmm1, zmm2 | fadd z0, z1, z2 | N/A | N/A |
| vaddps zmm0, zmm1, [addr_reg] | sub sp, sp, 64<br>str z31, [sp]<br>ld1w z31.s, p7/Z, [addr_reg]<br>fadd z0, z1, z31<br>ldr z31, [sp]<br>add sp, sp, 64 | N/A | N/A |

| # | Instruction | | opName3 | opWidth0 | src2Idx = xt.push_zreg(&a64); | src2Idx = a64.src2Idx; | ldlw(VReg(a64.zTmpIdx).s4, ptr(X_TMP_ADDR)); | ldlw(ZRegS(a64.zTmpIdx), PReg(a64.pTmpIdx)/Z, ptr(X_TMP_ADDR)); | ldr(ZReg(src2Idx), ptr(X_TMP_ADDR)); | fadd(VReg(a64.dstIdx).s4, VReg(a64.srcIdx).s4, VReg(src2Idx).s4); | fadd(ZReg(a64.dstIdx).s, ZReg(a64.srcIdx).s, ZReg(src2Idx).s); | mov(ZReg(a64.dstIdx).s, PReg(a64.pTmpIdx)/T_m, 0); | xt_pop_zreg(); |
|---|---|---|---|---|---|---|---|---|---|---|---|---|---|
| | isNoVector | | | | 1 | 1 | 1 | 1 | 1 | 1 | 1 | | 1 |
| | isVector128 | | | | 1 | 1 | 1 | 1 | 1 | 1 | 1 | | 1 |
| | isVector256 | | | | 1 | 1 | 1 | 1 | 1 | 1 | 1 | | 1 |
| | isVector512 | | | | 1 | 1 | 1 | 1 | 1 | 1 | 1 | 1 | 1 |
| 1 | VADDPS xmm1, xmm2, xmm3/m128 | | REG3 | 128 | | 1 | | | | 1 | | | |
| 2 | | | MEM0 | 128 | 1 | | 1 | | | 1 | | | 1 |
| 3 | VADDPS ymm1, ymm2, ymm3/m256 | | REG3 | 256 | | 1 | | | | | 1 | 1 | |
| 4 | | | MEM0 | 256 | 1 | | | 1 | | | 1 | 1 | 1 |
| 5 | VADDPS zmm1, zmm2, zmm3/m512 | | REG3 | 512 | | 1 | | | | | 1 | | |
| 6 | | | MEM0 | 512 | 1 | | | | 1 | | 1 | | 1 |

FIG. 25

| # | Generated Program |
|---|---|
| | isNoVector |
| | isVector128 |
| | isVector256 |
| | isVector512 |
| 1 | src2Idx = a64.src2Idx;<br>fadd(VReg(a64.dstIdx).s4, VReg(a64.srcIdx).s4, VReg(src2Idx).s4); |
| 2 | src2Idx = xt_push_zreg(&a64);<br>ld1(VReg(a64.zTmpIdx).s4, ptr(X_TMP_ADDR));<br>fadd(VReg(a64.dstIdx).s4, VReg(a64.srcIdx).s4, VReg(src2Idx().s4);<br>xt_pop_zreg(); |
| 3 | src2Idx = a64.src2idx;<br>fadd(ZReg(a64.dstIdx).s, ZReg(a64.srcIdx).s, ZReg(src2Idx).s);<br>if(isVector512) mov(ZReg(a64.dstIdx).s, PReg(a64.pTmpIdx)/T_m,0); |
| 4 | src2Idx = xt_push_zreg(&a64);<br>ld1w(ZRegS(a64.zTmpIdx), Preg(a64.pTmpIdx)/Z, ptr(X_TMP_ADDR));<br>fadd(ZReg(a64.dstIdx).s, ZReg(a64.srcIdx).s, ZReg(src2Idx).s);<br>if(isVector512) mov(ZReg(a64.dstIdx).s, PReg(a64.pTmpIdx)/T_m,0);<br>xt_pop_zreg(); |
| 5 | src2Idx = a64.src2Idx;<br>fadd(ZReg(a654.dstIdx).s, ZReg(a64.srcIdx).s, ZReg(srcIdx).s); |
| 6 | src2Idx = xt_push_zreg(&a64);<br>ldr(ZReg(src2Idx), ptr(X_TMP_ADDR));<br>fadd(ZReg(a64.dstIdx).s, ZReg(a64.srcIdx).s, ZReg(src2Idx).s);<br>xt_pop_zreg(); |

FIG. 26

| # | Instruction | opName3 | opWidth0 | src2Idx = XT_PUSH_ZREG(&a64); | src2Idx = a64.src2Idx; | ld1(VReg(a64.zTmpIdx).s4, ptr(X_TMP_ADDR)); | ld1w(ZReg(a64.zTmpIdx)/Z, ptr(X_TMP_ADDR)).PReg(a64.pTmpIdx) | ldr(ZReg(src2Idx), ptr(X_TMP_ADDR)); | fadd(VReg(a64.dstIdx).s4, VReg(a64.srcIdx).s4, VReg(src2Idx).s4); | fadd(ZReg(a64.dstIdx).s, ZReg(a64.srcIdx).s, ZReg(src2Idx).s); | MOV_FOR_512(ZReg(a64.dstIdx).s, PReg(a64.pTmpIdx)/T_m, 0); | XT_POP_ZREG(); |
|---|---|---|---|---|---|---|---|---|---|---|---|---|
| 1 | VADDPS xmm1, xmm2, xmm3/m128 | REG3 | 128 |  | 1 |  |  |  | 1 |  |  |  |
| 2 |  | MEM0 | 128 | 1 |  | 1 |  |  | 1 |  |  | 1 |
| 3 | VADDPS ymm1, ymm2, ymm3/m256 | REG3 | 256 |  | 1 |  |  |  |  | 1 | 1 |  |
| 4 |  | MEM0 | 256 | 1 |  |  | 1 |  |  | 1 | 1 | 1 |
| 5 | VADDPS zmm1, zmm2, zmm3/m512 | REG3 | 512 |  | 1 |  |  |  |  | 1 |  |  |
| 6 |  | MEM0 | 512 | 1 |  |  |  | 1 |  | 1 |  | 1 |

FIG. 28

| # | Generated Program |
|---|---|
| 1 | src2Idx = a64.src2idx;<br>fadd(VReg(a64.dstIdx).s4, VReg(a64.srcIdx).s4, VReg(src2Idx).s4); |
| 2 | src2Idx = XT_PUSH_ZREG(&a64);<br>ld1(VReg(a64.zTmpIdx).s4, ptr(X_TMP_ADDR));<br>fadd(VReg(a64.dstIdx).s4, VReg(a64.srcIdx).s4, VReg(src2Idx().s4);<br>XT_POP_ZREG(); |
| 3 | src2Idx = a64.src2idx;<br>fadd(ZReg(a64.dstIdx).s, ZReg(a64.srcIdx).s, ZReg(src2Idx).s);<br>MOV_FOR_512(ZReg(a64.dstIdx).s, PReg(a64.pTmpIdx)/T_m,0); |
| 4 | src2Idx = XT_PUSH_ZREG(&a64);<br>ld1w(ZRegS(a64.zTmpIdx), Preg(a64.pTmpIdx)/Z, ptr(X_TMP_ADDR));<br>fadd(ZReg(a64.dstIdx).s, ZReg(a64.srcIdx).s, ZReg(src2Idx).s);<br>MOV_FOR_512(ZReg(a64.dstIdx).s, PReg(a64.pTmpIdx)/T_m,0);<br>XT_POP_ZREG(); |
| 5 | src2Idx = a64.src2Idx;<br>fadd(ZReg(a654.dstIdx).s, ZReg(a64.srcIdx).s, ZReg(srcIdx).s); |
| 6 | src2Idx = XT_PUSH_ZREG(&a64);<br>ldr(ZReg(src2Idx), ptr(X_TMP_ADDR));<br>fadd(ZReg(a64.dstIdx).s, ZReg(a64.srcIdx).s, ZReg(src2Idx).s);<br>XT_POP_ZREG(); |

FIG. 29

TRANSLATION FUNCTION PROGRAM  /—254

```
bool usedAsTemp[32] = {false};
size_t stack_size = 0;

int XT_PUSH_ZREG (a64_t *a64) {
  int idx = getEmptyRegister(a64);
  stack_size = vector_size()/8;
  sub(sp, sp, stack_size);
  if (isNoVector || isVector128) str(VReg(idx), ptr(sp) );
    else str(ZReg(idx), ptr(sp) );
  usedAsTemp[idx] = true;
  return idx;
} void XT_POP_ZREG() {
  if (isNoVector || isVector128) ldr(VReg(idx), ptr(sp) );
    else ldr(ZReg(idx), ptr(sp) );
  add(sp, sp, stack_size);
} void MOV_FOR_512 (ZReg *dst, PReg *p, int imm) {
  if (isVector512) mov(dst, p, imm);
}
```

FIG. 30

INSTRUCTION TRANSLATION SUPPORT METHOD AND INFORMATION PROCESSING APPARATUS

CROSS-REFERENCE TO RELATED APPLICATION

This application is a continuation-in-part of patent application Ser. No. 17/177,246, filed on Feb. 17, 2021, which claims the benefit of priority from Japanese Patent Application No. 2020-090112, filed on May 22, 2020. This application further claims the benefit of priority from Japanese Patent Application No. 2021-074348, filed on Apr. 26, 2021. All of the aforementioned applications are incorporated herein by reference in their entireties.

FIELD

The embodiment discussed herein relates to an instruction translation support method and information processing apparatus.

BACKGROUND

It is sometimes the case that the user of an information processing system wishes to run an already existing program designed for a processor having an instruction set on a different processor having a different instruction set. For example, the user may wish to execute an existing program developed for small computers on a large-scale computer. On this occasion, if source code written in a high-level programming language is available as the existing program, the user compiles the source code using a compiler for the other processor to thereby generate an executable file for the other processor.

However, as for the existing program, sometimes its source code may be unavailable although an executable file designed for the original processor is ready for use. In that case, one conceivable approach is to translate assembly code for the original instruction set into assembly code or machine language code for the other instruction set. Assembly code is written in an assembly language, which is a low-level programming language. Instructions in assembly code correspond one-to-one with instructions in machine language code executable by a processor. A translation program for translating assembly code instructions is implemented for each pair of a translation source instruction set and a translation destination instruction set.

There is a proposed program translation apparatus for generating source code for a processor B from object code for a processor A. The proposed program translation apparatus replaces predefined instructions in the object code with intrinsic functions for the processor B.

There is also a proposed translation method for using native binding to replace calls to subject system library functions in an executable file with calls to functions in a native system library. In addition, there is a proposed instruction recombining method that inserts a transfer instruction causing a jump to the top of an instruction recombining library before the last instruction of a machine language instruction segment and rewrites the value of an address register included in a processor context.
Japanese Laid-open Patent Publication No. 2008-276735
Japanese Laid-open Patent Publication No. 2011-123917
International Publication Pamphlet No. WO 2012/145917

A translation source instruction set sometimes includes combined instructions capable of representing complex operations, as typically seen in complex instruction set computer (CISC) architectures. The instruction lengths of such combined instructions may be variable. Even instructions of the same type, having the same mnemonic, may have different types of operands (parameters). The term "having different types of operands" here may cover the following cases, for example: varying in terms of the number of operands; varying in terms of the type of memory area specified by each operand; and varying in terms of the data length of the memory area specified by each operand.

On the other hand, a translation destination instruction set is sometimes formed of simple instructions capable of representing only simple operations, as typically seen in reduced instruction set computer (RISC) architectures. In translating a complex instruction set into a simple instruction set, it is sometimes difficult to represent computation equivalent to one instruction of the translation source instruction set using a single instruction of the translation destination instruction set. In that case, therefore, one instruction in original assembly code before translation may correspond to a combination of two or more instructions in the translated assembly or machine language code.

There remains a problem that implementation of a translation program for translating a complex instruction set into a simple one causes a developer intending to undertake the implementation to assume a heavy burden. The translation program, for example, analyzes not only mnemonics of instructions before translation but also operands of the instructions and outputs different combinations of translated instructions according to types of operands. Manually producing such a translation program imposes a great burden on the developer. In addition, with each expansion of the translation source instruction set, there is a need for manual modification of the translation program.

SUMMARY

According to one embodiment, there is provided a non-transitory computer-readable recording medium storing therein a computer program that causes a computer to execute a process including receiving a table data set that represents mappings between a plurality of operand patterns indicating types of operands possibly included in a first instruction used in a first assembly language and a plurality of second instructions used in a second assembly language or a machine language corresponding to the second assembly language, the table data set mapping two or more of the plurality of second instructions to each of the plurality of operand patterns; and generating, based on the table data set, a translation program used to translate first code written in the first assembly language into second code written in the second assembly language or the machine language, the translation program defining a process of determining an operand pattern of an instruction included in the first code and outputting two or more instructions of the second code according to the determined operand pattern.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an exemplary translation program;

FIG. 6 illustrates an exemplary pattern table;

FIG. 7 illustrates the exemplary pattern table, continuing from FIG. 6;

FIG. 8 illustrates the exemplary pattern table, continuing from FIG. 7;

FIG. 9 illustrates the exemplary pattern table, continuing from FIG. 8;

FIG. 11 illustrates a first example of a translation function program;

FIG. 12 illustrates exemplary previews of the translation function program;

FIG. 13 illustrates a second example of the translation function program;

FIG. 24 illustrates an example of translation into instruction sets with different vector lengths;

FIG. 25 illustrates a first modification of the pattern table;

FIG. 26 illustrates the first modification of the pattern table, continuing from FIG. 25;

FIG. 28 illustrates a second modification of the pattern table;

FIG. 29 illustrates the second modification of the pattern table, continuing from FIG. 28; and FIG. 30 illustrates exemplary library functions of the translation function program.

DESCRIPTION OF EMBODIMENTS

Several embodiments will be described below with reference to the accompanying drawings.

(a) First Embodiment

A first embodiment is described hereinafter.

Figure 1:
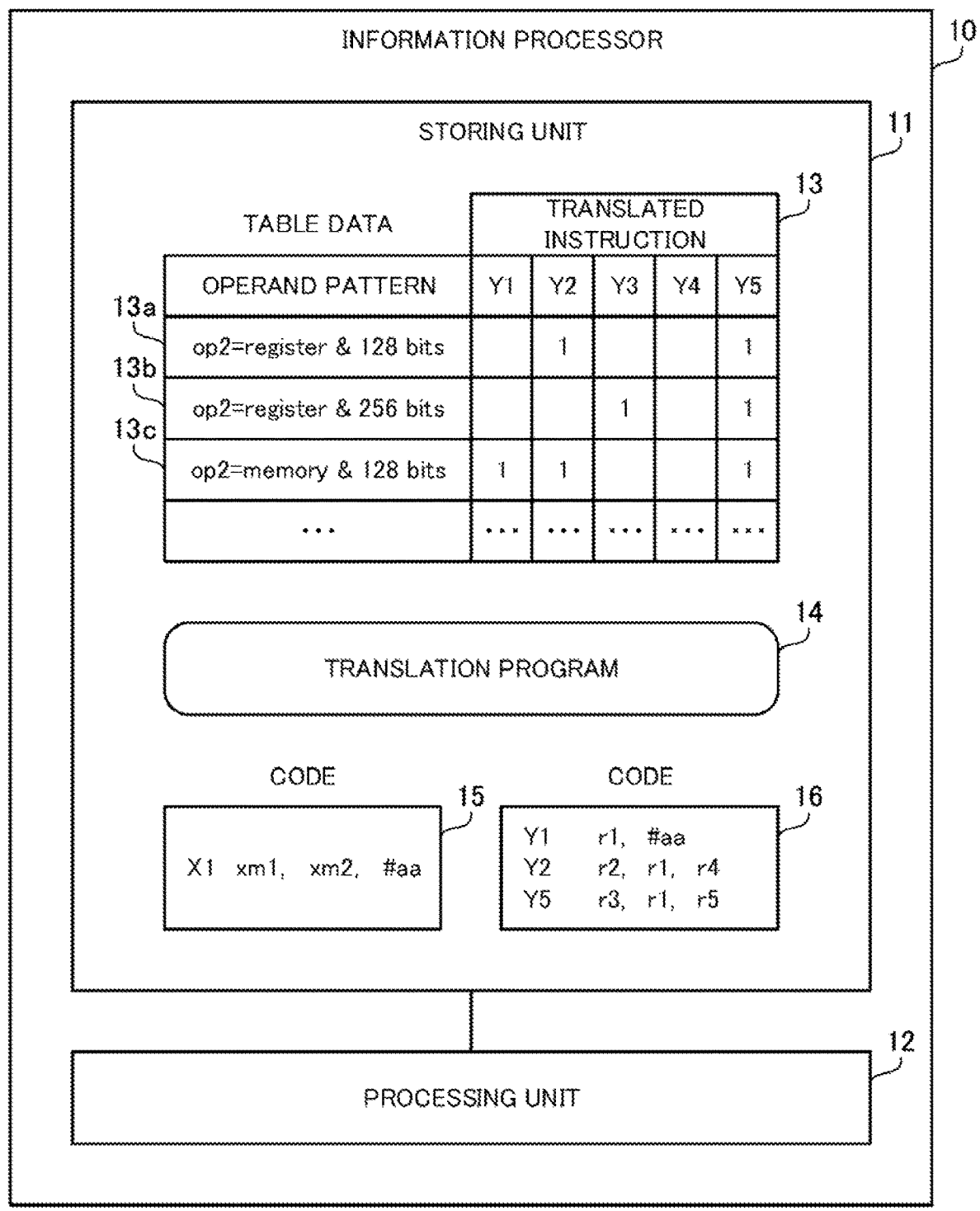
FIG. 1 illustrates an information processor according to a first embodiment.

FIG. 1 illustrates an information processor according to the first embodiment.

An information processor 10 of the first embodiment generates, from table data, a translation program for translating code written in an assembly language into code in a different assembly language or a machine language corresponding to the different assembly language. The generated translation program may be executed on the information processor 10 or a different information processor. The information processor 10 may be a client device or server device. The information processor 10 may be referred to, for example, as a computer or instruction translation support apparatus.

The information processor 10 includes a storing unit 11 and a processing unit 12. The storing unit 11 may be volatile semiconductor memory such as random access memory (RAM), or a non-volatile storage device such as a hard disk drive (HDD) or flash memory. The processing unit 12 is, for example, a processor such as a central processing unit (CPU), graphics processing unit (GPU), or digital signal processor (DSP). The processing unit 12 may include an electronic circuit designed for specific use, such as an application specific integrated circuit (ASIC) or field programmable gate array (FPGA). The processor executes programs stored in memory such as RAM (or in the storing unit 11). The term "multiprocessor", or simply "processor", may be used to refer to a set of multiple processors.

The storing unit 11 stores table data 13, which represents mappings between a plurality of operand patterns in a translation source assembly language and a plurality of instructions in a translation destination assembly language or machine language. Each assembly language is a low-level programming language that specifies assembly instructions corresponding one-to-one with machine language instructions executable by the processor. The translation source assembly language is compatible with a processor having a complex instruction set, like a so-called CISC processor. The translation destination assembly language or machine language is compatible with a processor having a relatively simple instruction set, like a so-called RISC processor.

Note however that the information processor 10 of the first embodiment does not specialize only in translating instructions of a CISC processor into those of a RISC processor. The first embodiment is also readily applicable to translating assembly code for the RISC processor into that for the CISC processor. Because an instruction set of the CISC processor contains instructions for simple operations similar to those of the RISC processor, it is possible to translate instructions of the RISC processor into those of the CISC processor for execution. On the other hand, the RISC processor also has single instructions each performing a complex operation in order to improve performance per clock cycle. In this case, it is possible to translate one instruction of the RISC processor into a plurality of instructions of the CISC processor.

The aforementioned operand patterns include operand patterns 13a, 13b, and 13c. Each of the operand patterns 13a, 13b, and 13c represents types of operands possibly included in an instruction X1 used in the translation source assembly language. The instruction X1 may be a combined instruction representing a complex operation, and may take different types of operands. The instruction X1 may vary, for example, in terms of the instruction length. The instruction X1 may vary, for example, in terms of the number of operands. The instruction X1 may vary, for example, in terms of the type of memory area specified by each operand. For instance, each operand indicates a register or main memory, or a different register type. The instruction X1 may vary, for example, in terms of the data length of data specified by each operand. For instance, each operand represents 128, 256, or 512 bits, and so on. The instruction X1 may be a vector operation instruction for running operations of the same kind on a plurality of unit data (words) in parallel.

In the example of FIG. 1, the operand pattern 13a indicates that a second operand specifies a register and the data length is 128 bits. The operand pattern 13b indicates that the second operand specifies a register and the data length is 256 bits. The operand pattern 13c indicates that the second operand specifies a memory area of the main memory and the data length is 128 bits.

The plurality of instructions used in the translation destination assembly language or machine language includes instructions Y1, Y2, Y3, Y4, and Y5. The instructions Y1, Y2, Y3, Y4, and Y5 are simple instructions each representing a relatively simple operation. For example, the instructions Y1, Y2, Y3, Y4, and Y5 have the same instruction length. For example, simple instructions representing operations between two data points do not include operands indicating the main memory. For example, operands in the instructions Y1, Y2, Y3, Y4, and Y5 have the same data length. For example, the instructions Y1, Y2, Y3, Y4, and Y5 do not include vector operation instructions.

Note here that it is difficult to represent an operation equivalent to one combined instruction using a single simple instruction. One combined instruction is often equivalent to a combination of two or more simple instructions. Therefore, the table data 13 maps, to each of the operand patterns 13a, 13b, and 13c, two or more instructions amongst the instructions Y1, Y2, Y3, Y4, and Y5.

The table data 13 is matrix data, for example, including a plurality of rows corresponding to the operand patterns 13a, 13b, and 13c and a plurality of columns corresponding to the instructions Y1, Y2, Y3, Y4, and Y5. One flag is located in a single cell at the intersection of one row with one column. The flag indicates whether an instruction corresponding to the column is used to translate the instruction X1 having an operand pattern corresponding to the row. For example, a flag equal to 1 is assigned when the instruction is used for the translation. The table data 13 is created, for example, by a developer who develops the translation program. The table data 13 may be created using spreadsheet software.

In the example of FIG. 1, the instructions Y2 and Y5 are mapped to the operand pattern 13a. Similarly, the instructions Y3 and Y5 are mapped to the operand pattern 13b, and the instructions Y1, Y2, and Y5 are mapped to the operand pattern 13c. The developer is able to define the aforementioned mappings by placing "1" in individual cells (1, 2), (1, 5), (2, 3), (2, 5), (3, 1), (3, 2), and (3, 5).

The processing unit 12 generates a translation program 14 based on the table data 13. The translation program 14 is software for translating code 15 written in the translation source assembly language into code 16 written in the translation destination assembly language or machine language. The code 15 is assembly code. The code 16 is assembly code or machine language code. The processing unit 12 generates, for example, source code of the translation program 14. The source code may be written in a high-level programming language such as C language.

The processing unit 12 analyzes the table data 13, and generates the translation program 14 such that instructions in the translation destination assembly language or machine language are output according to the mappings defined in the table data 13. The translation program 14 defines a process of determining an operand pattern of the instruction X1 included in the code 15 and outputting two or more instructions mapped to the determined operand pattern. The processing unit 12 may implement a determining process to identify a condition for outputting a combination of specific two or more instructions by scanning the table data 13 laterally and then determine if the identified condition is satisfied and an outputting process to output the combination of the two or more instructions. Alternatively, the processing unit 12 may implement a determining process to identify a condition for outputting one specific instruction by scanning the table data 13 vertically and then determine if the identified condition is satisfied and an outputting process to output the single instruction.

In the example of FIG. 1, the code 15 includes the instruction X1, and operands included in the instruction X1 satisfy the operand pattern 13c. According to the table data 13, the instructions Y1, Y2, and Y5 are mapped to the operand pattern 13c. Therefore, the instructions Y1, Y2, and Y5 are inserted into the code 16. Note that the processing unit 12 may generate the translation program 14 such that two or more instructions mapped to one operand pattern are output sequentially column-wise from left to right across the table data 13. In this case, the table data 13 also represents the order of the translated instructions.

According to the information processor 10 of the first embodiment, the table data 13 is created, which represents mappings between the operand patterns 13a, 13b, and 13c of the instruction X1 in the translation source assembly language and the instructions Y1, Y2, Y3, Y4, and Y5 in the translation destination assembly language or machine language. In the table data 13, a combination of two or more instructions is mapped to each operand pattern. Then, based on the table data 13, the translation program 14 for translating the instruction X1 is generated according to the mappings represented by the table data 13.

Herewith, the developer of the translation program 14 is able to efficiently define specifications of the translation program 14 using the table data 13. Creation of the table data 13 allows the developer to implement the translation program 14 without manually writing source code of the translation program 14. Therefore, the implementation burden of the translation program 14 is reduced. This is true especially when one combined instruction having various operands is translated into combinations of simple instructions according to the operands, as seen in the case of translating a CISC instruction set into a RISC instruction set.

In addition, if the translation source instruction set is expanded, the developer is able to implement the translation program 14 corresponding to the expanded instruction set by expanding the table data 13 without manually modifying the translation program 14.

Assume, for example, that the instruction set is expanded such that a mnemonic associated with the table data 13 is paired with a new operand pattern. In this case, a row corresponding to the new operand pattern is added to the table data 13, and flags are then simply assigned, within only the added row, to a combination of simple instructions corresponding to the operand pattern. If the operation of a translation target instruction is not covered by the existing instructions Y1, Y2, Y3, Y4, and Y5, one or more columns of translated instruction are simply added. In this case, there is no change in the mappings between the existing operands patterns 13a, 13b, and 13c and the translated instructions (i.e., there is no need to make modifications in the rows corresponding to the operand patterns 13a, 13b, and 13c). Therefore, even if description errors occur in adding a translation process for the new operand pattern, failures (translation errors) are observed only in the new operand pattern and have no effect on the translation processes corresponding to the existing operand patterns. That is, a check may be run independently on each operand pattern to see whether its translation process is correct, which also contributes to reduced implementation burden of the translation program 14.

(b) Second Embodiment

Next described is a second embodiment.

An information processor according to the second embodiment generates, from data in a table form, a translation program for translating assembly code of an instruction set (instruction set I) into assembly code of a different instruction set (instruction set A). In addition, the information processor of the second embodiment uses the generated translation program to carry out program porting to thereby translate machine language code of the instruction set I into that of the instruction set A. Note however that the generation of the translation program and the execution thereof may be performed by different information processors. The information processor of the second embodiment may be a client device or server device.

Figure 2:
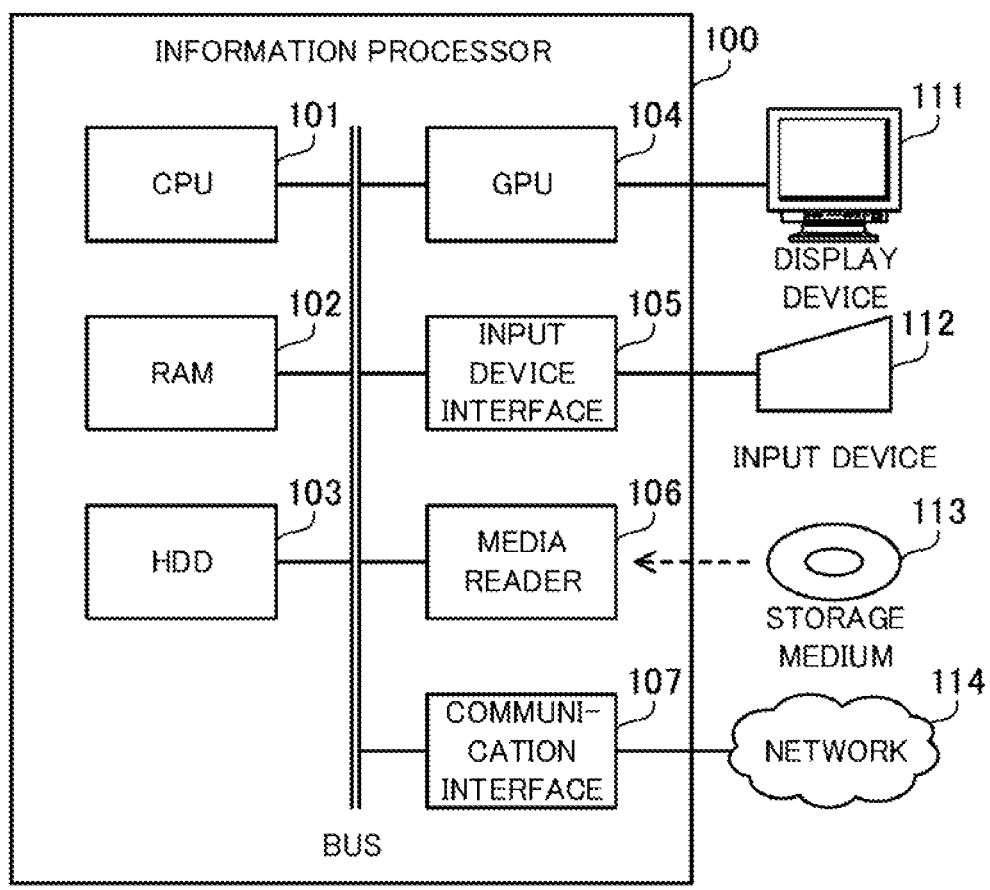
FIG. 2 is a block diagram illustrating exemplary hardware of an information processor according to a second embodiment.

FIG. 2 is a block diagram illustrating exemplary hardware of an information processor according to the second embodiment.

An information processor 100 includes a CPU 101, a RAM 102, an HDD 103, a GPU 104, an input device interface 105, a media reader 106, and a communication interface 107. These units of the information processor 100 are individually connected to a bus. Note that the information processor 100 corresponds to the information processor 10 of the first embodiment. The CPU 101 corresponds to the processing unit 12 of the first embodiment. The RAM 102 or the HDD 103 corresponds to the storing unit 11 of the first embodiment.

The CPU 101 is a processor configured to execute program instructions. The CPU 101 reads out at least part of programs and data stored in the HDD 103, loads them into the RAM 102, and executes the loaded programs. Note that the CPU 101 may include two or more processor cores and the information processor 100 may include two or more processors. The term "multiprocessor", or simply "processor", may be used to refer to a set of processors.

The RAM 102 is volatile semiconductor memory for temporarily storing therein programs to be executed by the CPU 101 and data to be used by the CPU 101 for its computation. The information processor 100 may be provided with a different type of memory other than RAM, or may be provided with two or more memory devices.

The HDD 103 is a non-volatile storage device to store therein software programs, such as an operating system (OS), middleware, and application software, and various types of data. The information processor 100 may be provided with a different type of storage device, such as flash memory or a solid state drive (SSD), or may be provided with two or more storage devices.

The GPU 104 produces video images in accordance with the CPU 101 and displays them on a screen of a display device 111 coupled to the information processor 100. The display device 111 may be any type of display, such as a cathode ray tube (CRT) display; a liquid crystal display (LCD); an organic electro-luminescence (OEL) display, or a projector. An output device, such as a printer, other than the display device 111 may also be connected to the information processor 100.

The input device interface 105 receives an input signal from an input device 112 connected to the information processor 100. Various types of input devices may be used as the input device 112, for example, a mouse, a touch panel, a touch-pad, or a keyboard. A plurality of types of input devices may be connected to the information processor 100.

The media reader 106 is a device for reading programs and data recorded on a storage medium 113. Various types of storage media may be used as the storage medium 113, for example, a magnetic disk such as a flexible disk (FD) or an HDD, an optical disk such as a compact disc (CD) or a digital versatile disc (DVD), and semiconductor memory. The media reader 106 copies the programs and data read out from the storage medium 113 to a different storage medium, for example, the RAM 102 or the HDD 103. The read programs are executed, for example, by the CPU 101. Note that the storage medium 113 may be a portable storage medium and used to distribute the programs and data. In addition, the storage medium 113 and the HDD 103 are sometimes referred to as computer-readable storage media.

The communication interface 107 is connected to a network 114 and communicates with different information processors via the network 114. The communication interface 107 may be a wired communication interface connected to a wired communication device, such as a switch or router, or may be a wireless communication interface connected to a wireless communication device, such as a base station or access point.

Next described is a program porting workflow for porting a user program developed for a CPU having the instruction set I to a CPU having the instruction set A. As for the user program, sometimes its source code written in a high-level programming language may be unavailable although an executable file for the port source CPU is ready for use. In that case, the executable file designed for the port source CPU is translated into an executable file for the port destination CPU.

Figure 3:
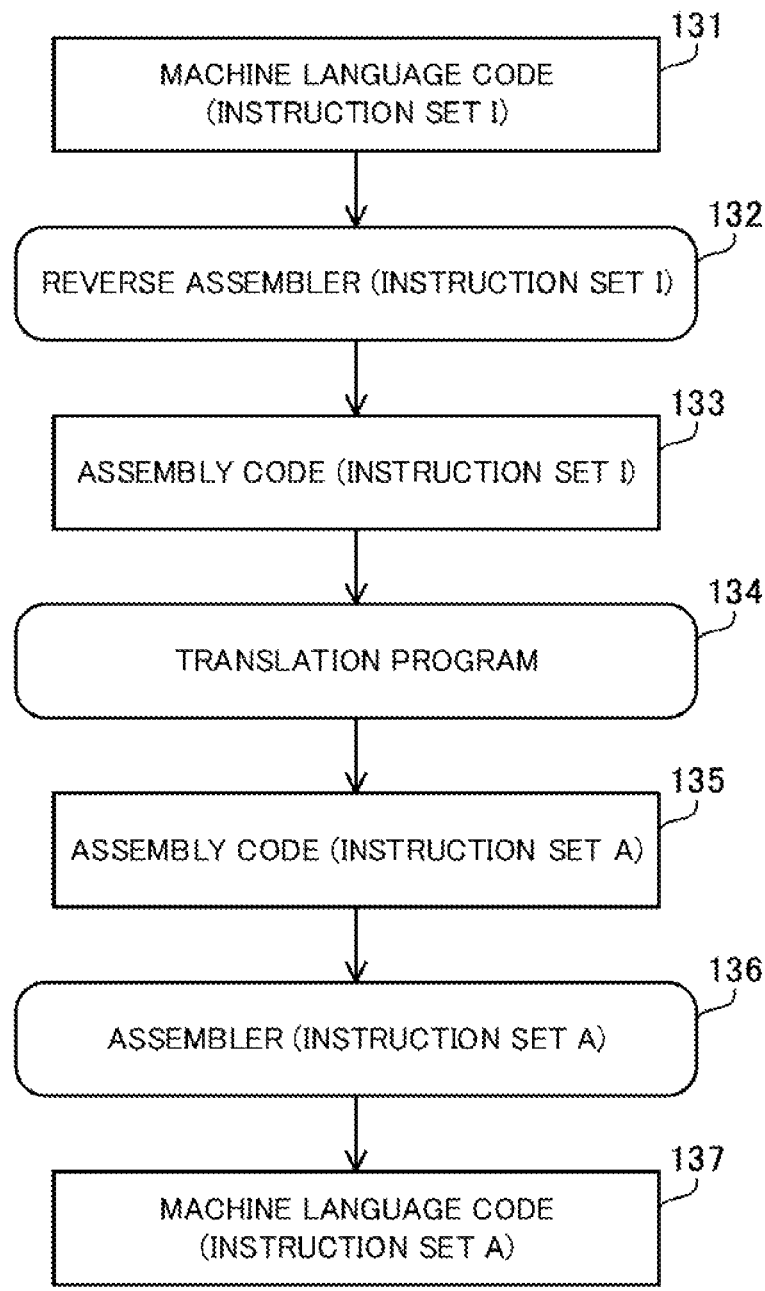
FIG. 3 illustrates an exemplary data flow of program porting.

FIG. 3 illustrates an exemplary data flow of program porting.

The information processor 100 acquires machine language code 131. The machine language code 131 is written in a machine language executable by the CPU having the instruction set I. The machine language code 131 is included in an executable file designed for the CPU having the instruction set I. The information processor 100 also acquires a reverse assembler 132. The reverse assembler 132 is software for translating machine language code of the instruction set I into assembly code of the instruction set I. The reverse assembler 132 is provided, for example, by the maker of the CPU.

The information processor 100 inputs the machine language code 131 to the reverse assembler 132 to translate the machine language code 131 into assembly code 133. The assembly code 133 is written in an assembly language of the instruction set I. The assembly language is a low-level programming language which represents types of machine language instructions and operands using strings to thereby enhance readability. There is a one-to-one correspondence between machine language instructions of the instruction set I and assembly instructions thereof.

The information processor 100 inputs the assembly code 133 to a translation program 134 to translate the assembly code 133 into assembly code 135. The assembly code 135 is written in an assembly language of the instruction set A. There is a one-to-one correspondence between machine language instructions of the instruction set A and assembly instructions thereof. The instruction set I corresponds to a CISC architecture while the instruction set A corresponds to a RISC architecture. Therefore, one instruction of the assembly code 133 may be translated into two or more instructions of the assembly code 135.

As will be described later, the information processor 100 generates in advance the translation program 134. A translation program is prepared for each combination of a translation source assembly language and a translation destination assembly language. The information processor 100 acquires an assembler 136. The assembler 136 is software for translating assembly code of the instruction set A into machine language code thereof. The assembler 136 is provided, for example, by the maker of the CPU having the instruction set A.

The information processor 100 inputs the assembly code 135 to the assembler 136 to thereby translate the assembly code 135 into machine language code 137. The machine language code 137 is written in a machine language executable by the CPU having the instruction set A. The machine language code 137 is included in an executable file designed for the CPU having the instruction set A. Herewith, the information processor 100 is able to translate the machine language code 131 of the instruction set I into the machine language code 137 of the instruction set A. Depending on the purposes, the translation program 134 need not be used in combination with the reverse assembler 132 and the assembler 136.

Figure 4:
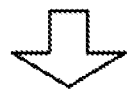
FIG. 4 illustrates exemplary assembly codes before and after translation.

FIG. 4 illustrates exemplary assembly codes before and after translation.

Assembly code 141 is written in the assembly language of the instruction set I. The assembly code 141 corresponds to the aforementioned assembly code 133. Assembly code 142 is written in the assembly language of the instruction set A. The assembly code 142 corresponds to the aforementioned assembly code 135.

The instruction set I corresponds to a CISC architecture. Therefore, the assembly code 141 includes combined instructions representing complex operations.

Specifically, the assembly code 141 includes four instructions of mov, add, sub, and vpmaxsd. The first instruction of the assembly code 141 is to store 64-bit data in a register. The fourth instruction of the assembly code 141 is to compare operand #1 (xmm14) and operand #2 (xmm15) on a 32-bit word-by-word basis and store a larger word in operand #0 (xmm0). Each of operands #0, #1, and #2 is an operand representing a vector register having a data length of 128 bits. That is, the fourth instruction performs comparisons of each of four pairs of words and causes storage of four words.

On the other hand, the instruction set A corresponds to a RISC architecture. Therefore, the assembly code 142 includes only simple instructions representing simple operations. Specifically, the assembly code 142 includes a greater number of instructions than the assembly code 141, twenty one instructions. An instruction group 142a including seven instructions corresponds to the first instruction of the assembly code 141. That is, an operation equivalent to the first instruction of the assembly code 141 is represented using the seven instructions of the instruction set A. This is because, in the instruction group 142a, storage of a 64 bit-long word is implemented by dividing the word into four 16-bit words. An instruction group 142b including twelve instructions corresponds to the fourth instruction of the assembly code 141. That is, an operation equivalent to the fourth instruction of the assembly code 141 is represented using the twelve instructions of the instruction set A.

In the assembly code 141, each operand denoted by rN (N is a natural number from 0 to 15) represents a general-purpose register with a register index N. In the assembly code 142, each operand denoted by xN (N is a natural number from 0 to 30) represents a general-purpose register with the register index N; the operand denoted by sp represents a stack pointer register; each operand denoted by pN (N is a natural number from 0 to 15) represents a predicate register (mask register) with the register index N; and each operand denoted by zN (N is a natural number from 0 to 31) represents a vector register with the register index N.

In addition, a mnemonic mov represents an instruction that copies data. A mnemonic add represents an instruction for data addition. A mnemonic sub represents an instruction for data subtraction. A mnemonic orr represents an instruction for a bitwise logical OR operation. A mnemonic str represents an instruction that reads data from memory and places it in a register. Bitwise not represents an instruction for a logical negation operation. A mnemonic cmpge represents an instruction that compares two vector registers word by word and places the comparison results in a predicate register. A mnemonic cmpgt represents an instruction that compares two vector registers word by word and places the comparison results in a predicate register. A mnemonic ldr represents an instruction that loads data stored in a register into memory.

In addition, [x24] indicates execution of the corresponding str or ldr instruction using an x24 register as an address register. ".s" indicates execution of the corresponding instruction, treating its vector or predicate register as a register for storing data represented by each word consisting of 32 bits. Each of "/m" and "/z" following a predicate register indicates that only words whose flags in the predicate register are enabled are subjected to the operation when the instruction is executed. "/m" indicates that words whose flags are disabled hold original values (i.e., values before the execution of the corresponding instruction). "/z" indicates that, for words whose flags are disabled, their values are cleared to zero after the execution of the corresponding instruction.

FIG. 5 illustrates an exemplary translation program.

The information processor 100 creates in advance a translation program 143 capable of translating the assembly code 141 into the assembly code 142. The translation program 143 corresponds to the aforementioned translation program 134.

Translation processing specified by the translation program 143 includes reading one instruction from translation source assembly code, extracting a mnemonic from the read instruction, and generating operand information by analyzing operands included in the read instruction. The mnemonic is a part of the instruction other than the operands and represents a type of the instruction, such as add, sub, or vpmaxsd. The operand information indicates the results of the operand analysis and represents characteristics of the operands. The operand information includes information on the number of operands, the type of each operand such as an immediate value, a register, or a main memory address, the data length of each operand, the presence or absence of options, and the like.

The translation processing specified by the translation program 143 calls a different translation function according to the extracted mnemonic. The translation program 143 includes a translation function for each mnemonic. For example, the translation program 143 includes a translation function translateADD corresponding to the mnemonic add; a translation function translateSUB corresponding to the mnemonic sub; and a translation function translateVPMAXSD corresponding to the mnemonic vpmaxsd. In calling a translation function, the translation processing designates the aforementioned operand information as parameters. Each translation function outputs a set of instructions according to the operand information given as its parameters. A different set of instructions may be output for different operand information even if the mnemonic is the same.

At this point, the question of how to implement each translation function becomes an issue. Because mappings between the types of operands and instructions to be output are sometimes complex, the developer bears a heavy burden if they need to manually write source code of each instruction function. In addition, there is a risk that errors are introduced to the translation function due to mistakes made by the developer while writing the source code. In view of these problems, the information processor 100 supports implementation of translation functions. The developer uses a pattern table to be described below to succinctly describe specifications of each translation function. Based on the pattern table written by the developer, the information processor 100 automatically generates source code of the translation function. Next described is an exemplary implementation of the translation function translateVPMAXSD amongst a plurality of translation functions.

FIG. 6 illustrates an exemplary pattern table.

A pattern table is prepared for each mnemonic. A pattern table 144 corresponds to the mnemonic vpmaxsd and represents specifications of the translation function translateVPMAXSD.

The pattern table 144 includes a plurality of rows and a plurality of columns. The developer is able to build the pattern table 144 using a user interface of spread sheet software. The pattern table 144 includes a title row for column names. In addition, the pattern table 144 includes thirty-one rows corresponding to thirty-one operand patterns.

In addition, the pattern table 144 includes column B for pattern numbers. The pattern table 144 also includes column E for formats of instructions of the instruction set I. The pattern table 144 further includes columns F, G, H, I, N, O, and P for seven operand conditions defining the operand patterns. The operand conditions are information included in the operand information which is parameters of the translation function translateVPMAXSD.

The pattern table 144 further includes thirty-six columns for thirty-six source code descriptions used to output instructions of the instruction set A. Each column for one source code description usually corresponds to a single instruction of the instruction set A. These thirty-six columns are arranged such that an appropriate sequence of instructions is obtained by outputting translated instructions indicated by some columns amongst the thirty-six columns in order from left to right across the columns of the pattern table 144. Therefore, the thirty-six columns include columns representing translated instructions of the same content.

FIG. 6 depicts a portion of the entire pattern table 144, identified by a subset of rows and a subset of columns. The subset of rows includes the title row and rows for pattern numbers #1 to #11. The subset of columns includes column B with pattern numbers, column E with formats of instructions, columns F, G, H, I, N, O, and P with operand conditions, and eight columns with translated instructions. That is, FIG. 6 represents the top-left section of the pattern table 144.

Colum F indicates types of operand #0. In the pattern table 144, REG0 is the only value included in column F. REG0 represents the first register. Colum G indicates types of operand #1. In the pattern table 144, REG1 is the only value included in column G. REG1 represents the second register. Colum H indicates types of operand #2. Each value in column H takes REG2 or MEM0. REG2 represents the third register. MEM0 represents a main memory area. Column I indicates types of operand #3. Each value in column I takes INVALID, REG3, or MEM0. INVALID represents that operand #3 does not exist. REG3 represents the fourth register. MEM0 represents the main memory area.

Column N indicates the data length (width in bits) of operand #0. In the pattern table 144, each value in column N takes 128, 256, or 512 bits. Column O indicates mask specifications. Each value in column O is blank, NO, ZERO, or MERG. Blank cells and NO indicate no masks. When no mask is used, all words in the vector register are designated as operation targets. Note that data of 128 bits includes four 32-bit long words, data of 256 bits includes eight words, and data of 512 bits includes sixteen words.

ZERO indicates application of a mask and zero filling. MERG indicates application of a mask and data coupling. When a mask is applied in an operation, only some of the words are designated as operation targets. When zero filling is applied in an operation, the bits of each word not specified are converted into a string of all 0's. When data coupling is applied in an operation, for each word not specified, a corresponding bit string previously existing in a register for storing operation results is copied into the word. Therefore, data coupling means to couple results of the previous operation and those of the latest operation.

Pre-translation instructions may include omission options k and/or z. The omission option k is an option to specify words to be targeted for the operation amongst a plurality of words. That is, a pre-translation instruction including no omission option k uses no mask. The omission option z is an option to indicate zero filling. A pre-translation instruction using a mask and including the omission option z indicates application of zero filling. A pre-translation instruction using a mask and not including the omission option z indicates data coupling. Therefore, the values in column O are determined based on the omission options k and z included in pre-translation instructions.

Column P indicates broadcasting specifications. Each value in column P is blank, 0 (no broadcasting), or 1 (broadcasting). In the case of no broadcasting, a plurality of words specified by operand #2 is compared one-to-one with a plurality of words specified by operand #3 (one-to-one comparison operation). In the case of broadcasting, a plurality of words specified by operand #2 is compared with one word specified by operand #3 (many-to-one comparison operation).

Each value in the thirty-six columns of the translated instructions is blank or 1. 0 may be used instead of blank. The values in the thirty-six columns are considered as one-bit flags. A blank in the cell where a row of one operand pattern and a column of one translated instruction intersect indicates that the translated instruction is not used to translate a pre-translation instruction having the operand pattern. On the other hand, 1 in the cell indicates that the translated instruction is used to translate a pre-translation instruction having the operand pattern. The developer is able to define specifications of the translation function translateVPMAXSD by entering 1's in appropriate cells of the pattern table 144.

FIG. 7 illustrates the exemplary pattern table, continuing from FIG. 6.

FIG. 7 depicts a portion of the entire pattern table 144, identified by a subset of rows and a subset of columns. The subset of rows includes the title row and the rows for pattern numbers #1 to #11, as in the case of FIG. 6. The subset of columns includes the remaining twenty-eight columns with translated instructions. That is, FIG. 7 represents the top-right section of the pattern table 144.

FIG. 8 illustrates the exemplary pattern table, continuing from FIG. 7.

FIG. 8 depicts a portion of the entire pattern table 144, identified by a subset of rows and a subset of columns. The subset of rows includes rows for pattern numbers #12 to #31. The subset of columns includes column B with patter numbers, column E with formats of instructions, columns F, G, H, I, N, O, and P with the operand conditions, and the eight columns with the translated instructions, as in FIG. 6. That is, FIG. 8 represents the bottom-left section of the pattern table 144.

Figure 9:
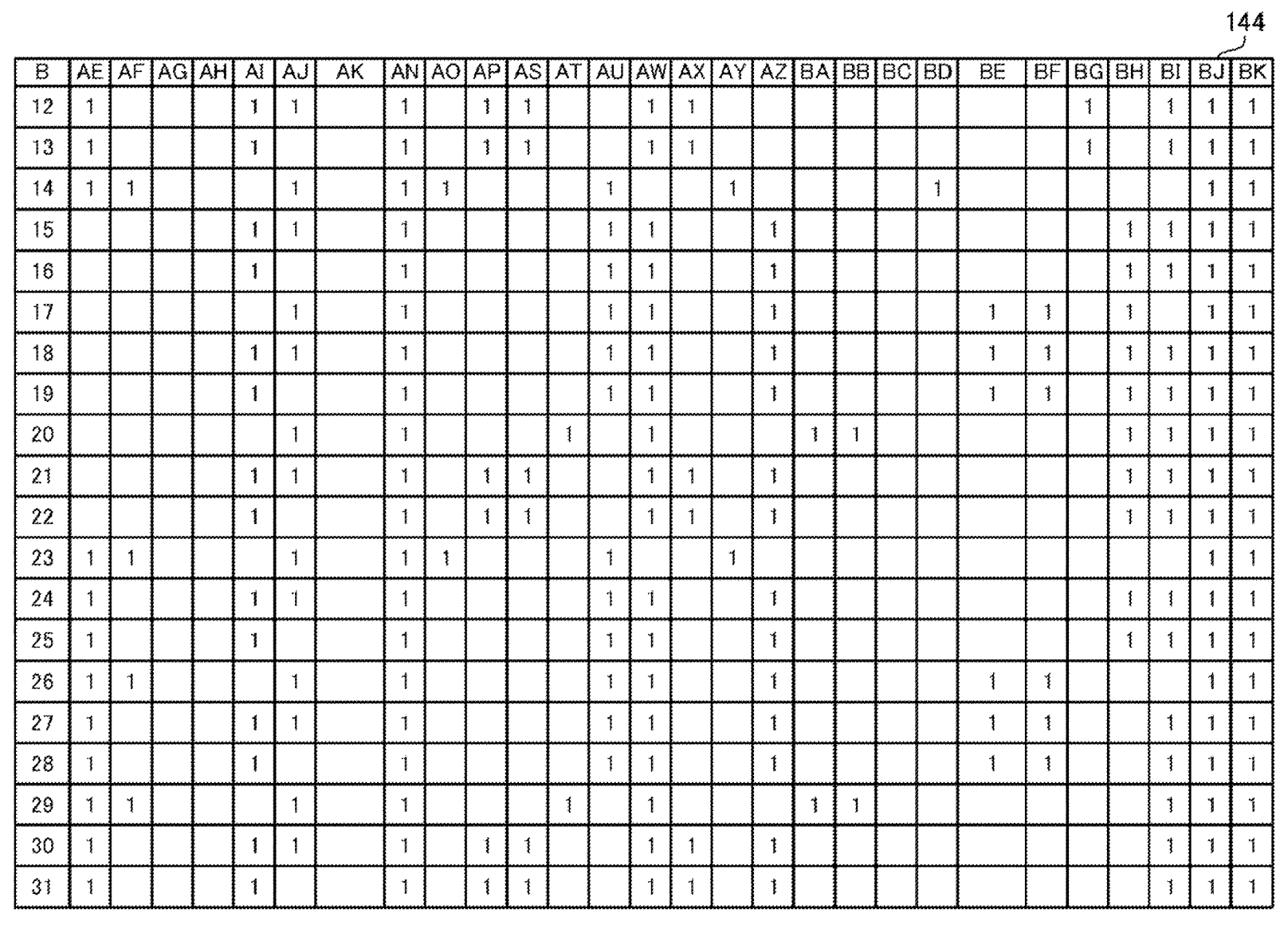

FIG. 9 illustrates the exemplary pattern table, continuing from FIG. 8.

FIG. 9 depicts a portion of the entire pattern table 144, identified by a subset of rows and a subset of columns. The subset of rows includes the rows for pattern numbers #12 to #31, as in the case of FIG. 8. The subset of columns includes the remaining twenty-eight columns with the translated instructions, as in FIG. 7. That is, FIG. 9 represents the bottom-right section of the pattern table 144.

Figure 10:
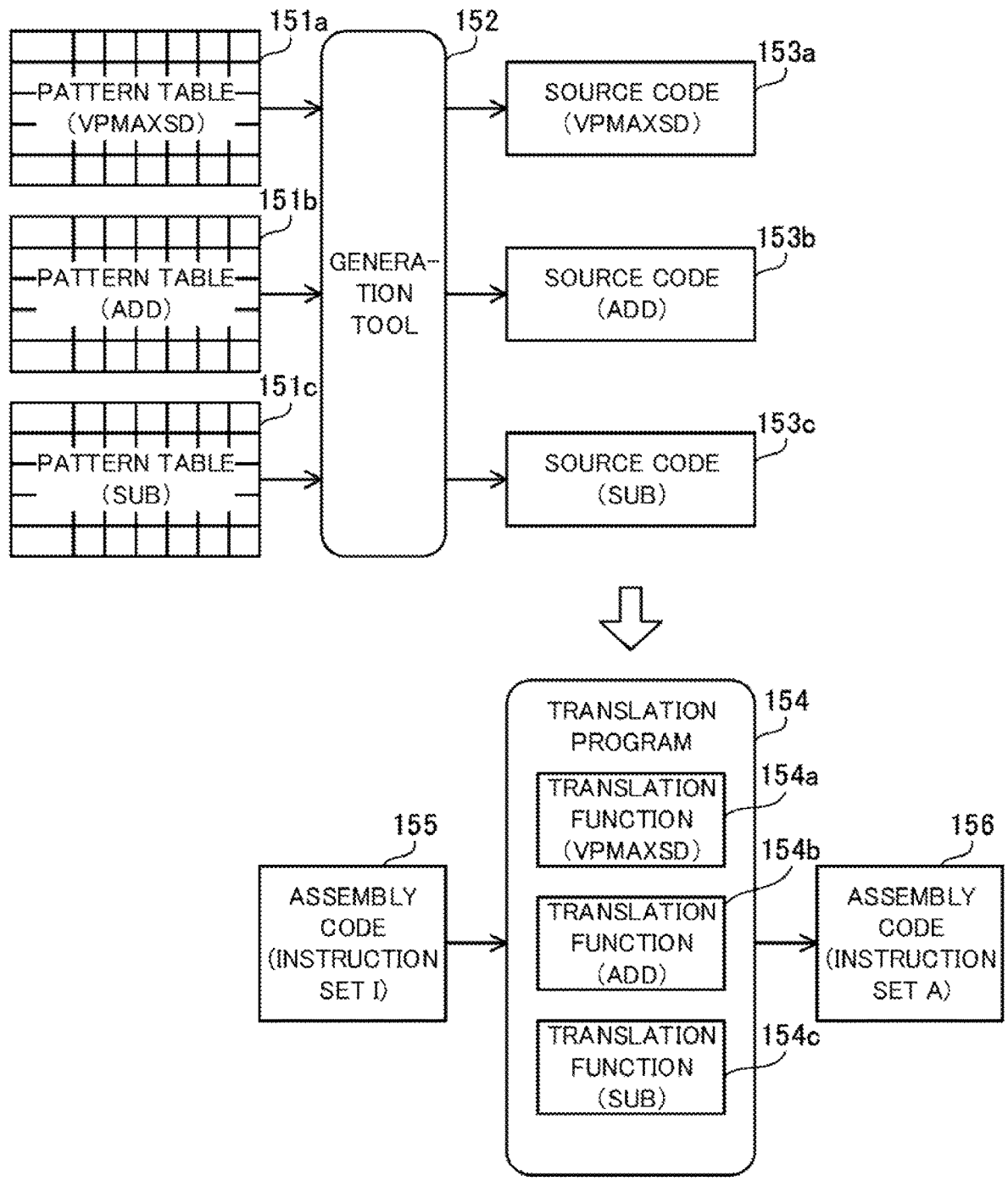
FIG. 10 illustrates an exemplary data flow of translation function generation.

FIG. 10 illustrates an exemplary data flow of translation function generation.

As stated previously, the developer creates a pattern table for each mnemonic. For example, the developer creates a pattern table 151a representing specifications of the mnemonic vpmaxsd, a pattern table 151b representing specifications of the mnemonic add, and a pattern table 151c representing specifications of the mnemonic sub. The pattern table 151a corresponds to the aforementioned pattern table 144. The information processor 100 receives the pattern tables 151a, 151b, and 151c and inputs them to a generation tool 152 to thereby generate source codes 153a, 153b, and 153c.

The generation tool 152 is software for generating source code of one translation function from each pattern table. Such source codes of translation functions are written in a high-level programming language such as C language. The source code 153a is source code of the translation function translateVPMAXSD and generated from the pattern table 151a. The source code 153b is source code of the translation function translateADD and generated from the pattern table 151b. The source code 153c is source code of the translation function translateSUB and generated from the pattern table 151c.

The information processor 100 compiles source code of a translation program body and the source codes 153a, 153b, and 153c using a compiler tailored for the programming language. Herewith, the information processor 100 generates a translation program 154 including translation functions 154a, 154b, and 154c. The translation function 154a corresponds to the mnemonic vpmaxsd and is generated from the source code 153a. The translation function 154b corresponds to the mnemonic add and is generated from the source code 153b. The translation function 154c corresponds to the mnemonic sub and is generated from the source code 153c.

After generating the translation program 154, the information processor 100 receives an assembly code 155 written in the assembly language of the instruction set I. The information processor 100 runs the translation program 154 with a designation of the assembly code 155 as input data, and generates an assembly code 156 written in the assembly language of the instruction set A. During execution of the translation program 154, the information processor 100 extracts each instruction from the assembly code 155 and calls a translation function corresponding to a mnemonic of the extracted instruction. The called translation function outputs an appropriate sequence of instructions based on the operand information.

Next described is how to generate a translation function from a pattern table.

Row-major order and column-major order are known as methods used to express mappings indicated by the pattern table 144 in a translation function program. In the row-major order, the translation function program includes thirty-one blocks corresponding to the thirty-one operand patterns. In the row-major order, the information processor 100 scans the pattern table 144 in a transverse direction and generates one block of the translation function program from each row of the pattern table 144. On the other hand, in the column-major order, the translation function program includes thirty-six blocks corresponding to the thirty-six source code descriptions. In the column-major order, the information processor 100 scans the pattern table 144 in a longitudinal direction and generates one block of the translation function program from each column of the pattern table 144, The row-major order is described first below.

FIG. 11 illustrates a first example of the translation function program.

A translation function program 145 is source code of the translation function translateVPMAXSD and generated from the pattern table 144 in the row-major order. The translation function program 145 includes blocks 145a and 145b. The block 145a corresponds to the row of pattern number #1 in the pattern table 144. The block 145b corresponds to the row of pattern number #2 in the pattern table 144. The translation function program 145 also includes blocks corresponding to pattern numbers #3 to #31.

The block 145a includes a condition determination statement used to check whether the operand information, which is parameters, satisfies a specific execution condition. The execution condition of the block 145a is to meet the operand conditions found in the row of pattern number #1 and columns F, G, H, I, and N of the pattern table 144. That is, the execution condition of the block 145a is that operand #0 is REG0, operand #1 is REG1, operand #2 is REG2, operand #3 is INVALID, and the data length is 128 bits.

The block 145a also includes twelve execution statements for outputting instructions of the instruction set A. In the row of pattern number #1 within the pattern table 144, a flag equal to 1 is set in each of columns U, AD, AG, AH, AK, AN, AO, AU, AY, BC, BJ, and BK. Therefore, the block 145a includes twelve execution statements corresponding to the column names of these twelve columns. The twelve execution statements are arranged sequentially in order from left to right across the columns of the pattern table 144.

The block 145b includes a condition determination statement used to check whether the operand information, which is parameters, satisfies a specific execution condition. The execution condition of the block 145b is to meet the operand conditions found in the row of pattern number #2 and columns F, G, H, I, and N of the pattern table 144. That is, the execution condition of the block 145b is that operand #0 is REG0, operand #1 is REG1, operand #2 is MEM0, operand #3 is INVALID, and the data length is 128 bits.

The block 145b also includes sixteen execution statements for outputting instructions of the instruction set A. In the row of pattern number #2 within the pattern table 144, a flag equal to 1 is set in each of columns T, U, W, AA, AD, AG, AI, AK, AN, AU, AW, AZ, BC, BI, BJ, and BK. Therefore, the block 145b includes sixteen execution statements corresponding to the column names of these sixteen columns. The sixteen execution statements are arranged sequentially in order from left to right across the columns of the pattern table 144.

Thus, the row-major order generates each block of the translation function program 145 from one row of the pattern table 144. The information processor 100 is able to generate thirty-one blocks corresponding to the thirty-one operand patterns independently of each other. The condition determination statement of each block is generated from the operand conditions of columns F, G, H, I, N, O, and P. The execution statements of each block are generated from the column names of columns in which "1" is written. The information processor 100 simply arranges the multiple column names, starting from the left and going toward the right of the pattern table 144.

FIG. 12 illustrates exemplary previews of the translation function program.

The information processor 100 may display a preview of each block of the translation function program 145 on the pattern table 144. In the example of FIG. 12, previews of the blocks 145a and 145b are presented in column Q of the pattern table 144. The preview function may be implemented using a user interface of spreadsheet software. In that case, in response to an addition or deletion of a flag equal to 1 by the developer, the spreadsheet software updates a corresponding preview in column Q in real time. Herewith, the information processor 100 supports the developer in creating the pattern table 144. For example, the preview function is realized by writing the following mathematical expression in a cell Q1 of the pattern table 144.

=IF(T1< >" ", $T0 & CHAR(10), " ") & IF(U1< >" ", $U0 & CHAR(10), " ") & IF(W1< >" ", $W0 & CHAR(10), " ") & IF(Y1< >" ", $Y0 & CHAR(10), " ") & IF(Y1< >" ", $Y0 & CHAR(10), " ") & IF(BK1< >" ", $BK0, " ").

If a value other than 0 is found in a cell at row 1 and column T, the aforementioned mathematical expression outputs, to the cell Q1, a string written in a cell at the leading row (title row) and column T together with a new-line character. If a value other than 0 is found in a cell at row 1 and column U, the mathematical expression also creates an additional output of a string written in a cell at the leading row and column U together with a new-line character to the cell Q1. Further, if a value other than 0 is found in a cell at row 1 and column BK, the mathematical expression also creates an additional output of a string written in a cell at the leading row and column BK to the cell Q1.

Next described is the column-major order. The developer may give, to the information processor 100, a designation of which one of the row-major and column-major order methods to be adopted in generating the translation function program.

FIG. 13 illustrates a second example of the translation function program.

A translation function program 146 is source code of the translation function translateVPMAXSD and generated from the pattern table 144 in the column-major order. The translation function program 146 includes blocks 146a and 146b. The block 146a corresponds to column T of the pattern table 144. The block 146b corresponds to column U of the pattern table 144. The translation function program 146 also includes blocks corresponding to the remaining thirty-four columns.

The block 146a includes a condition determination statement used to check whether the operand information, which is parameters, satisfies a specific execution condition. The execution condition of the block 146a is that the operand information falls into any one of twenty-six operand patterns having "1" in column T amongst the thirty-one operand patterns of the pattern table 144. Operand conditions of the twenty-six operand patterns are linked by logical ORs. The block 146a also includes one execution statement corresponding to column T. The execution statement of the block 146a is the column name of column T.

The block 146b includes a condition determination statement used to check whether the operand information, which is parameters, satisfies a specific execution condition. The execution condition of the block 146b is that the operand information falls into any one of twenty-three operand patterns having "1" in column U amongst the thirty-one operand patterns of the pattern table 144. Operand conditions of the twenty-three operand patterns are linked by logical ORs. The block 146b also includes one execution statement corresponding to column U. The execution statement of the block 146b is the column name of column U.

Thus, the column-major order generates each block of the translation function program 146 from one column of the pattern table 144. The information processor 100 is able to generate thirty-six blocks corresponding to the thirty-six columns independently of each other. The information processor 100 arranges, in the translation function program 146, the thirty-six blocks sequentially column-wise, starting from the left and going toward the right of the pattern table 144.

In the column-major order, simply linking operand conditions of operand patterns having a flag equal to 1 by logical ORs significantly increases the size of the condition determination statement of each block. Note however that the condition determination statement of each block includes redundant comparison expressions, which may be simplified to make the condition determination statement sufficiently short. On the other hand, the column-major order includes only one execution statement in each block, and thus prevents repetition of the same execution statements in the translation function program. Therefore, compared to the row-major order, the column-major order is able to generate a high-speed translation function program by simplifying the condition determination statements to thereby reduce the size of the translation function program.

Simplification of the condition determination statements may be automatically performed by a compiler during optimization processing when the compiler compiles source code of the translation function program 146. Alternatively, the information processor 100 may apply logic compression for simplifying logic expressions to the condition determination statements by use of a formula manipulation library in generating the source code of the translation function program 146. Alternatively, the information processor 100 may simplify the condition determination statements in an explicit procedure described below.

Figure 14:
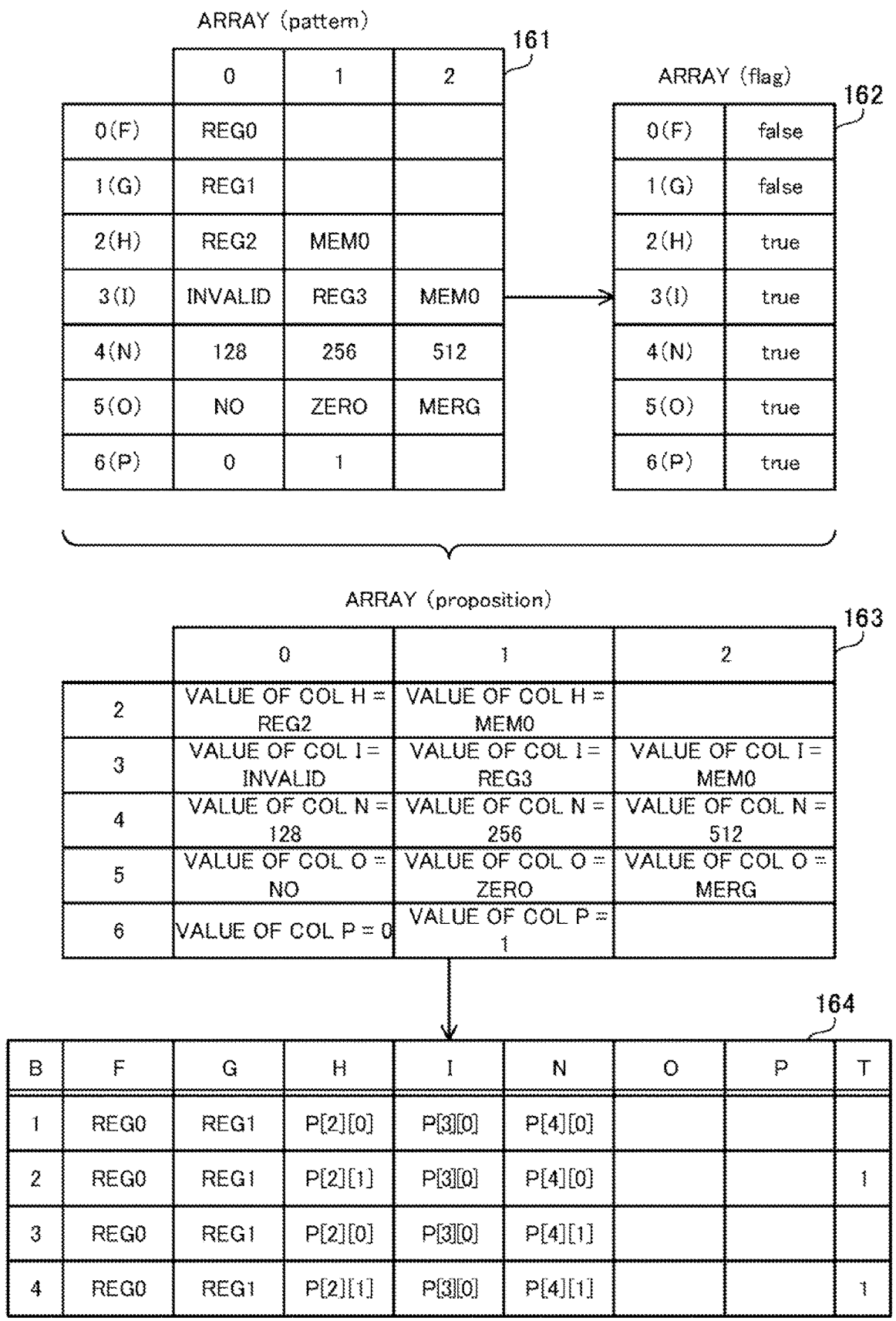
FIG. 14 illustrates exemplary simplification of operand conditions.

FIG. 14 illustrates exemplary simplification of operand conditions.

First, based on the pattern table 144, the information processor 100 calculates the number of columns C by counting columns representing operand conditions, and calculates the number of rows R by counting rows representing operand patterns. The information processor 100 generates an array 161 (array pattern) with size of C×R and an array 162 (array flag) with size of C.

Next, the information processor 100 scans each of columns F, G, H, I, N, O, and P representing the operand conditions, then enumerates one or more unique values for each column and registers them in the array 161. In each element (0, *) in the array 161, a unique value in column F is registered. Specifically, an element (0, 0)=REG0. In each element (1, *), a unique value in column G is registered. Specifically, an element (1, 0)=REG1. In each element (2, *), a unique value in column H is registered. Specifically, an element (2, 0)=REG2 and an element (2, 1)=MEM0.

Similarly, in each element (3, *), a unique value in column I is registered. Specifically, an element (3, 0)=INVALID, an element (3, 1)=REG3, and an element (3, 2)=MEM0. In each element (4, *), a unique value in column N is registered. Specifically, an element (4, 0)=128, an element (4, 1)=256, and an element (4, 2)=512. In each element (5, *), a unique value in column O is registered. Specifically, an element (5, 0)=NO, an element (5, 1). ZERO, and an element (5, 2)=MERG. In each element (6, *), a unique value in column P is registered. Specifically, an element (6, 0)=0 and an element (6, 1)=1.

Next, the information processor 100 detects, on the array 161, columns each including only one unique value amongst columns F, G, H, I, N, O, and P representing the operand conditions. Because operand conditions having only one unique value do not affect the selection of an operand pattern, they may be ignored. The information processor 100 is able to detect columns including only one unique value by searching the array 161 for each element number in the first dimension, whose element (*, 1) is blank. In the example of FIG. 14, amongst columns F, G, H, I, N, O, and P, columns F and G are columns each including only one unique value. The information processor 100 updates, to false, elements in the array 162 corresponding to the detected columns. Note that each element in the array 162 has an initial value of true.

Next, the information processor 100 extracts, from the array 162, element numbers whose elements have a value of true, and then extracts, from the array 161, elements whose element numbers in the first dimension match those extracted from the array 162. The information processor 100 generates a proposition of "column symbol=value" from each element extracted from the array 161 and registers it in an array 163 (array proposition).

An element (2, 0) in the array 163 is a proposition that "the value of column H is REG2". An element (2, 1) is a proposition that "the value of column H is MEM0". An element (3, 0) is a proposition that "the value of column I is INVALID". An element (3, 1) is a proposition that "the value of column I is REG3". An element (3, 2) is a proposition that "the value of column I is MEM0". An element (4, 0) is a proposition that "the value of column N is 128". An element (4, 1) is a proposition that "the value of column N is 256". An element (4, 2) is a proposition that "the value of column N is 512". An element (5, 0) is a proposition that "the value of column O is NO". An element (5, 1) is a proposition that "the value of column O is ZERO". An element (5, 2) is a proposition that "the value of column O is MERG". An element (6, 0) is a proposition that "the value of column P is 0". An element (6, 1) is a proposition that "the value of column P is 1".

Next, the information processor 100 replaces, amongst columns F, G, H, I, N, O, and P of the pattern table 144, values in columns H, I, N, O, and P for which the propositions are defined with proposition symbols each indicating a corresponding element in the array 163. In the example of FIG. 14, each element of the array 163 is denoted by P[*][*]. Herewith, a pattern table 164 is generated.

As for pattern number #1 in the pattern table 164, the values of columns H, I, and N are replaced with P[2][0], P[3][0], and P[4][0]. As for pattern number #2, the values of columns H, I, and N are replaced with P[2][1], P[3][0], and P[4][0]. As for pattern number #3, the values of columns H, I, and N are replaced with P[2] (0), P[3][0], and P[4][1]. As for pattern number #4, the values of columns H, I, and N are replaced with P[2][1], P[3][0], and P[4][1].

Figure 15:
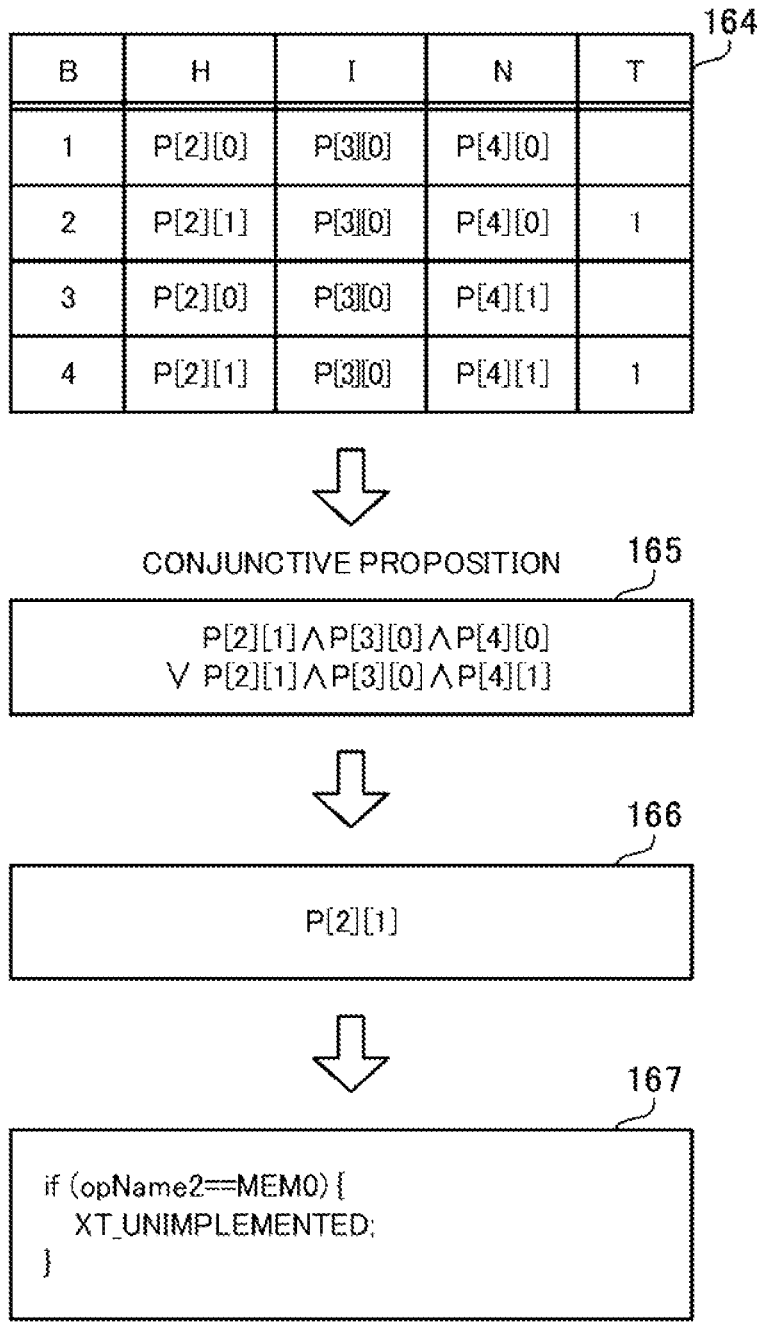
FIG. 15 illustrates the exemplary simplification of operand conditions, continuing from FIG. 14.

FIG. 15 illustrates the exemplary simplification of operand conditions, continuing from FIG. 14.

Next, the information processor 100 generates, based on the pattern table 164, a conjunctive proposition for each of columns T to BK representing translated instructions. At this time, the information processor 100 first generates a conjunctive proposition for each row of the pattern table 164 by connecting the proposition symbols in columns H, I, N, O, and P by logical ANDs. Then, the information processor 100 generates a conjunctive proposition of each column by further connecting, by logical ORs, conjunctive propositions of rows each having a value of "1". Subsequently, the information processor 100 simplifies the conjunctive proposition with proposition symbols using a logical compression algorithm.

For ease of explanation, assume here that the pattern table 164 includes only four rows with pattern numbers #1 to #4 and columns B, H, I, N, and T. In this case, the information processor 100 generates a conjunctive proposition of P[2][0] and P [3][0] and P [4][0] for pattern number #1. The information processor 100 also generates a conjunctive proposition of P[2][1] and P [3][0] and P[4][0] for pattern number #2. The information processor 100 generates a conjunctive proposition of P[2][0] and P[3][0] and P[4][1] for pattern number #3. The information processor 100 also generates a conjunctive proposition of P[2][1] and P [3][0] and P[4][1] for pattern number #4.

In column T, a flag equal to 1 is set for pattern numbers #2 and #4. Therefore, the information processor 100 connects the conjunctive propositions of pattern numbers #2 and #4 by a logical OR to thereby generate a conjunctive proposition 165 of column T. The conjunctive proposition 165 is P[2][1] and P[3][0] and P[4][0] or P[2][1] and P[3][0] and P[4][1].

The information processor 100 simplifies the conjunctive proposition 165 to generate a conjunction proposition 166. Note here that only the proposition P[3][0] appears in column I of the pattern table 164 (i.e., for this translation target mnemonic, only operand patterns with the proposition P[3][0] being always true are input as those associated with column I). For this reason, the proposition P[3][0] does not affect the conclusion of the conjunctive proposition 165 and may therefore be deleted. In addition, only the propositions P[4][0] and P[4][1] appear in column N of the pattern table 164. Because both the propositions P[4][0] and P[4][1] appear in the conjunctive proposition 165, the propositions P[4][0] and P[4][1] may therefore be deleted. As a result, a simplified conjunctive proposition 166 is P[2][1].

The information processor 100 puts the proposition symbol included in the conjunctive proposition 166 back to the original proposition format. Herewith, the conjunctive proposition 166 is converted into "the value of column H is MEM0". The information processor 100 translates each proposition into a conditional expression in the form of "column name==value". Herewith, a condition determination statement of opName2==MEM0 is generated. The information processor 100 generates a block 167 including the condition determination statement and an execution statement corresponding to the column name of column T. In the above-described manner, the information processor 100 is able to generate a translation function program in the column-major order.

Next described are functions and procedures of the information processor 100.

Figure 16:
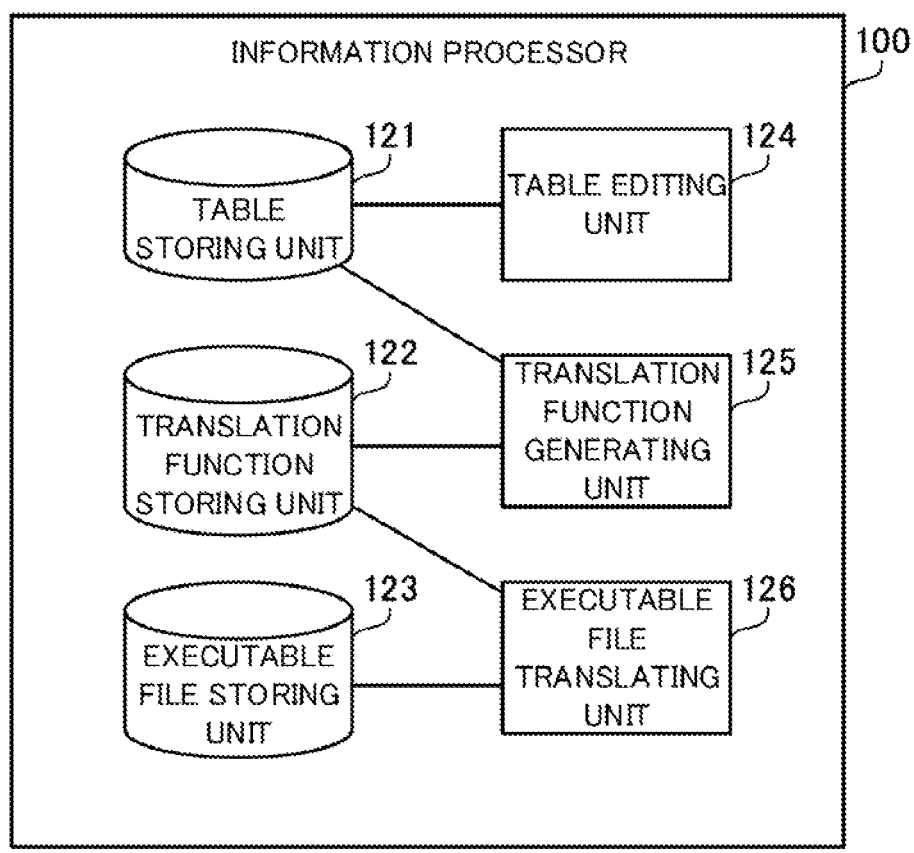
FIG. 16 is a block diagram illustrating exemplary functions of the information processor.

FIG. 16 is a block diagram illustrating exemplary functions of an information processor.

The information processor 100 includes a table storing unit 121, a translation function storing unit 122, and an executable file storing unit 123. These storing units are implemented using a storage area secured, for example, in the RAM 102 or the HDD 103. The information processor 100 also includes a table editing unit 124, a translation function generating unit 125, and an executable file translating unit 126. These processing units are implemented, for example, using programs executed by the CPU 101.

The table storing unit 121 stores pattern tables each corresponding to a mnemonic included in the instruction set I. The translation function storing unit 122 stores source codes of translation functions each corresponding a mnemonic included in the instruction set I. The translation function storing unit 122 also stores source code of the translation program body.

In addition, the translation function storing unit 122 stores a compiler for compiling these source codes. The translation function storing unit 122 also stores a compiled translation program. The translation function storing unit 122 further stores a reverse assembler for the instruction set I and an assembler for the instruction set A. The executable file storing unit 123 stores an executable file of the pre-translation instruction set I and an executable file of the post-translation instruction set A.

The table editing unit 124 displays a pattern table stored in the table storing unit 121 on a screen of the display device 111. The table editing unit 124 receives an input operation performed on the input device 112, then updates the pattern table according to the input operation, and stores the updated pattern table in the table storing unit 121. The table editing unit 124 may be implemented using spreadsheet software.

The translation function generating unit 125 reads a pattern table corresponding to each mnemonic from the table storing unit 121, then generates source code of a translation function corresponding to the mnemonic, and stores the generated source code in the translation function storing unit 122. The translation function generating unit 125 generates the source codes of the translation functions using either one of the aforementioned row-major and column-major orders. The translation function generating unit 125 may receive an input operation indicating the selection of the row-major or column-major order from the developer.

In addition, the translation function generating unit 125 generates source code of the translation program body used to call a translation function corresponding to each mnemonic, and stores the generated source code in the translation function storing unit 122. The translation function generating unit 125 generates a compiled translation program by inputting the source code of the translation program body and the source codes of the translation functions to the compiler, and stores the compiled translation program in the translation function storing unit 122.

The executable file translating unit 126 receives an input operation specifying the executable file of the translation target instruction set I. In response, the executable file translating unit 126 reads the executable file of the instruction set I from the executable file storing unit 123 and generates assembly code of the instruction set I by inputting the read executable file to the reverse assembler. The executable file translating unit 126 reads the compiled translation program from the translation function storing unit 122, runs the translation program with a designation of the assembly code of the instruction set I as input data to thereby generate assembly code of the instruction set A. The executable file translation unit 126 generates an executable file of the instruction set A by inputting the assembly code of the instruction set A to the assembler, and stores the generated executable file of the instruction set A in the executable file storing unit 123.

Figure 17:
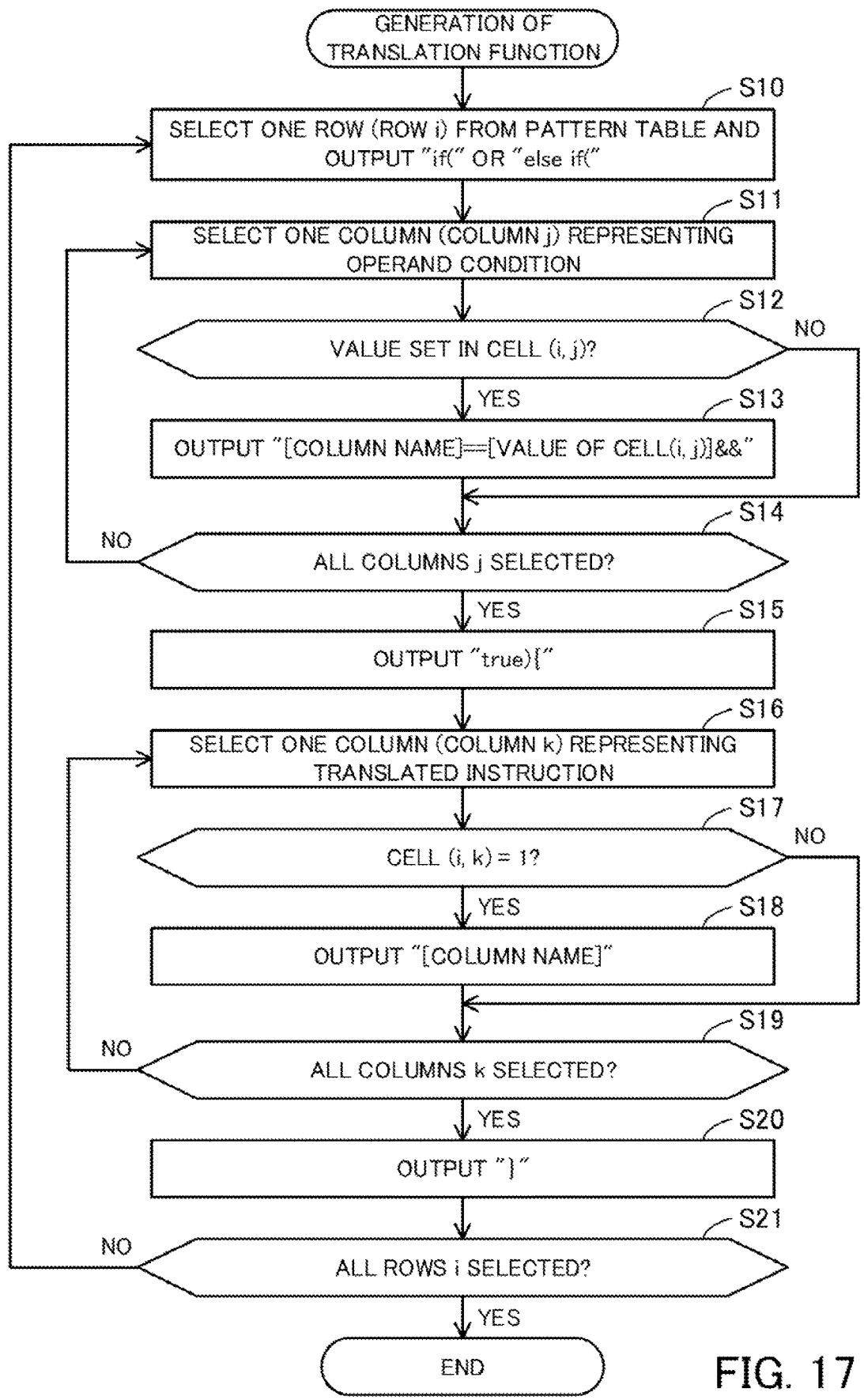
FIG. 17 is a flowchart illustrating a first exemplary procedure for the translation function generation.

FIG. 17 is a flowchart illustrating a first exemplary procedure for translation function generation.

The generation of a translation function described below uses the row-major order.

(Step S10) The translation function generating unit 125 selects, from a pattern table, one row representing an operand pattern. The row selected here is denoted by row i (i is an integer greater than or equal to 1). The translation function generation unit 125 outputs a string of "if(". Note however that, in the case of selecting a row for the second time and onward, the translation function generating unit 125 outputs a string of "else if(" instead.

(Step S11) The translation function generating unit 125 selects one column representing an operand condition from the pattern table. The column selected here is denoted by column j (j is an integer greater than or equal to 1).

(Step S12) The translation function generating unit 125 determines whether a value is set in cell (i, j) of the pattern table. If a value is set in cell (i, j), the translation function generating unit 125 moves to step S13, and otherwise moves to step S14.

(Step S13) The translation function generating unit 125 extracts, from the pattern table, the column name written in the title row of column j and the value of cell (i, j). The translation function generating unit 125 outputs a string of "[column name]==[value of cell(i, j)]&&".

(Step S14) The translation function generating unit 125 determines whether all columns each representing an operand condition have been selected in step S11. If all the columns representing operand conditions have been selected, the translation function generating unit 125 moves to step S15, and otherwise returns to step S11.

(Step S15) The translation function generating unit 125 outputs a string of "true){".

(Step S16) The translation function generating unit 125 selects one column representing a translated instruction from the pattern table. The column selected here is denoted by column k (k is an integer greater than or equal to 1).

(Step S17) The translation function generating unit 125 determines whether the value of cell (i, k) in the pattern table is 1. If the value of cell (i, k) is 1, the translation function generating unit 125 moves to step S18. If cell (i, k) is blank, the translation function generating unit 125 moves to step S19.

(Step S18) The translation function generating unit 125 extracts the column name written in the title row of column k from the pattern table. The column name corresponds to an execution statement of source code for generating an instruction of the instruction set A. The translation function generating unit 125 outputs the extracted column name.

(Step S19) The translation function generating unit 125 determines whether all columns each representing a translated instruction have been selected in step S16. If all the columns representing translated instructions have been selected, the translation function generating unit 125 moves to step S20, and otherwise returns to step S16.

(Step S20) The translation function generating unit 125 outputs a string of "}".

(Step S21) The translation function generating unit 125 determines whether all rows each representing an operand pattern have been selected in step S10. If all the rows representing operand patterns have been selected, the translation function generating unit 125 ends the translation function generation, and otherwise returns to step S10.

Figure 18:
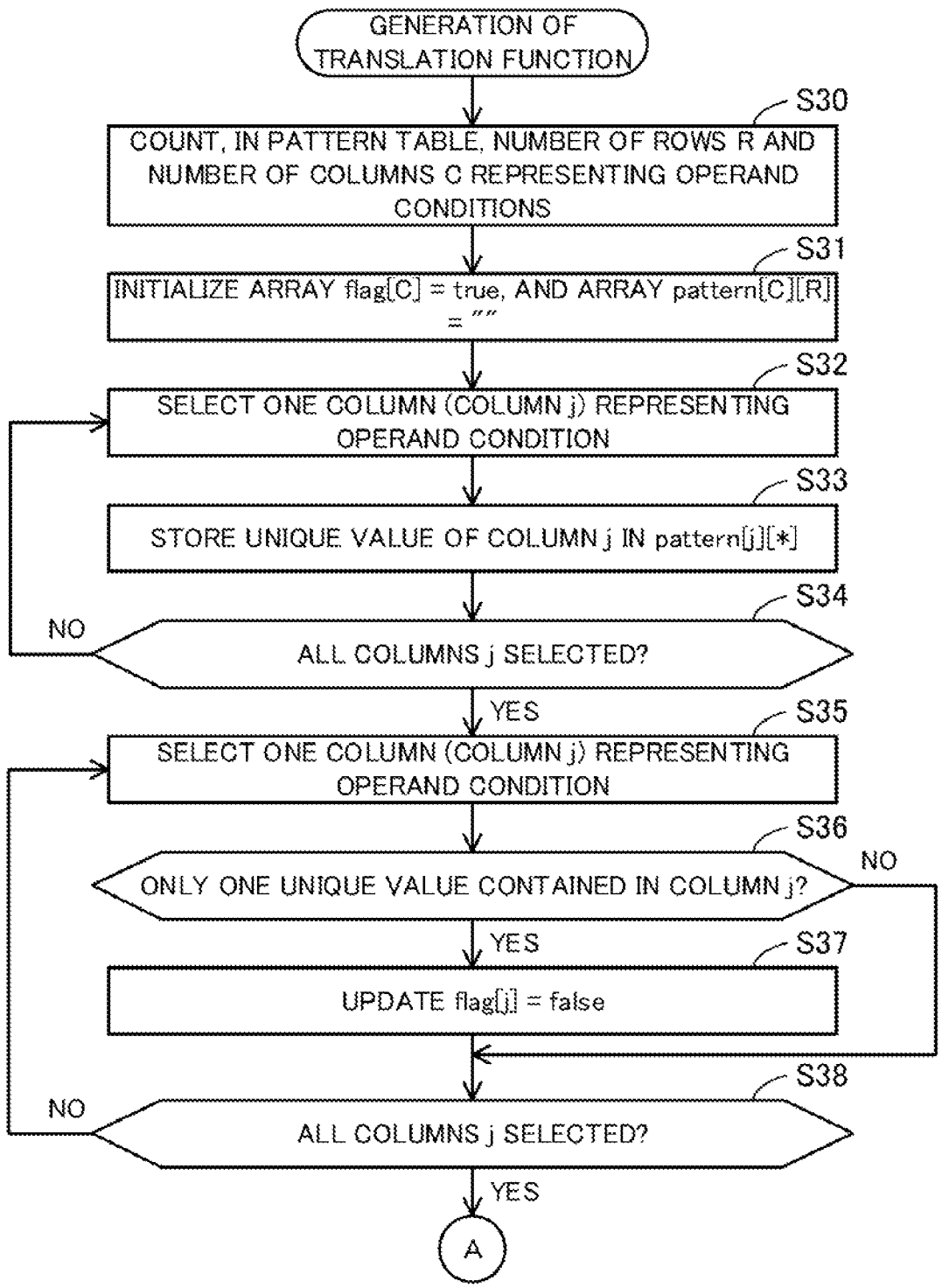
FIG. 18 is a flowchart illustrating a second exemplary procedure for the translation function generation.

FIG. 18 is a flowchart illustrating a second exemplary procedure for the translation function generation.

The generation of a translation function described below uses the column-major order.

(Step S30) The translation function generating unit 125 calculates the number of rows R by counting rows representing operand patterns in a pattern table. The translation function generating unit 125 also calculates the number of columns C by counting columns representing operand conditions in the pattern table.

(Step S31) The translation function generating unit 125 generates an array flag of size C and initializes each element of the array flag to true. The translation function generating unit 125 also generates an array pattern of size C×R, and initializes each element of the array pattern to blank. Note that each element number of the array flag is an integer greater than or equal to 0 and less than or equal to (C−1). In the array pattern, numbers in the first dimension are integers greater than or equal to 0 and less than or equal to (C−1), and numbers in the second dimension are integers greater than or equal to 0 and less than or equal to (R−1).

(Step S32) The translation function generating unit 125 selects one column representing an operand condition from the pattern table. The column selected here is denoted by column j.

(Step S33) The translation function generating unit 125 scans column j of the pattern table, and detects one or more unique values in column j and then stores each of them in pattern[j][*]. The unique values are those obtained after eliminating duplication amongst values present in column j. The notation pattern[j][*] indicates, amongst elements of the array pattern, each element whose number in the first dimension is j. The filling pattern[j][*] with unique values, the translation function generating unit 125 gives priority to an element whose number in the second dimension is smaller.

(Step S34) The translation function generating unit 125 determines whether all columns each representing an operand condition have been selected in step S32. If all the columns representing operand conditions have been selected, the translation function generating unit 125 moves to step S35, and otherwise returns to step S32.

(Step S35) The translation function generating unit 125 selects one column representing an operand condition from the pattern table. The column selected here is denoted by column j.

(Step S36) The translation function generating unit 125 determines whether column j contains only one unique value based on the array pattern. For example, the translation function generating unit 125 determines whether pattern[j][1] is blank. If pattern[j][1] is blank, column j contains only one unique value. If pattern[j][1] is not blank, column j contains two or more unique values. The translation function generating unit 125 moves to step S37 if column j contains only one unique value, and moves to step S38 if column j contains two or more unique values.

(Step S37) The translation function generating unit 125 updates flag[j] with false.

(Step S38) The translation function generating unit 125 determines whether all columns each representing an operand condition have been selected in step S35. If all the columns representing operand conditions have been selected, the translation function generating unit 125 moves to step S39, and otherwise returns to step S35.

Figure 19:
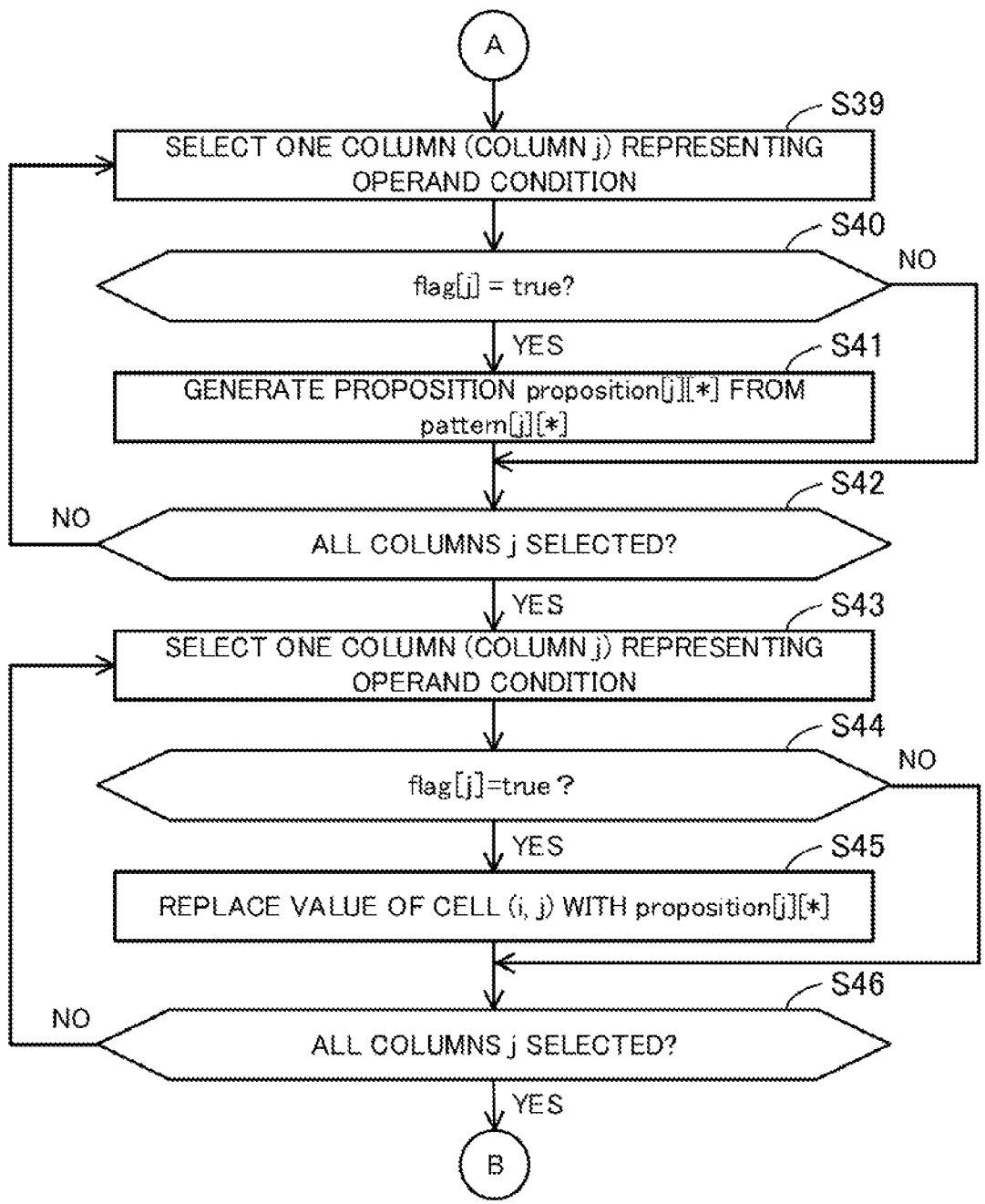
FIG. 19 is a flowchart illustrating the second exemplary procedure for the translation function generation, continuing from FIG. 18.

FIG. 19 is a flowchart illustrating the second exemplary procedure for the translation function generation, continuing from FIG. 18.

(Step S39) The translation function generating unit 125 selects one column representing an operand condition from the pattern table. The column selected here is denoted by column j.

(Step S40) The translation function generating unit 125 determines whether flag[j] is true. If flag[j] is true, the translation function generating unit 125 moves to step S41. If flag[j] is false, the translation function generating unit 125 moves to step S42.

(Step S41) The translation function generating unit 125 identifies, for each non-blank pattern[j][*], the column symbol representing column j and a condition value stored in pattern[j][*], and generates a proposition that "the value of [column symbol] is [condition value]". The translation function generating unit 125 stores the generated proposition in proposition[j][*]. Numbers in the second dimension of proposition[j][*] are the same as those of pattern[j][*].

(Step S42) The translation function generating unit 125 determines whether all columns each representing an operand condition have been selected in step S39. If all the columns representing operand conditions have been selected, the translation function generating unit 125 moves to step S43, and otherwise returns to step S39.

(Step S43) The translation function generating unit 125 selects one column representing an operand condition from the pattern table. The column selected here is denoted by column j.

(Step S44) The translation function generating unit 125 determines whether flag[j] is true. The translation function generating unit 125 moves to step S45 if flag[j] is true, and moves to step S46 if flag[j] is false.

(Step S45) The translation function generating unit 125 replaces the value of cell (i, j) in the pattern table with a proposition symbol representing the proposition in proposition [j][*].

(Step S46) The translation function generating unit 125 determines whether all columns each representing an operand condition have been selected in step S43. If all the columns representing operand conditions have been selected, the translation function generating unit 125 moves to step S47, and otherwise returns to step S43.

Figure 20:
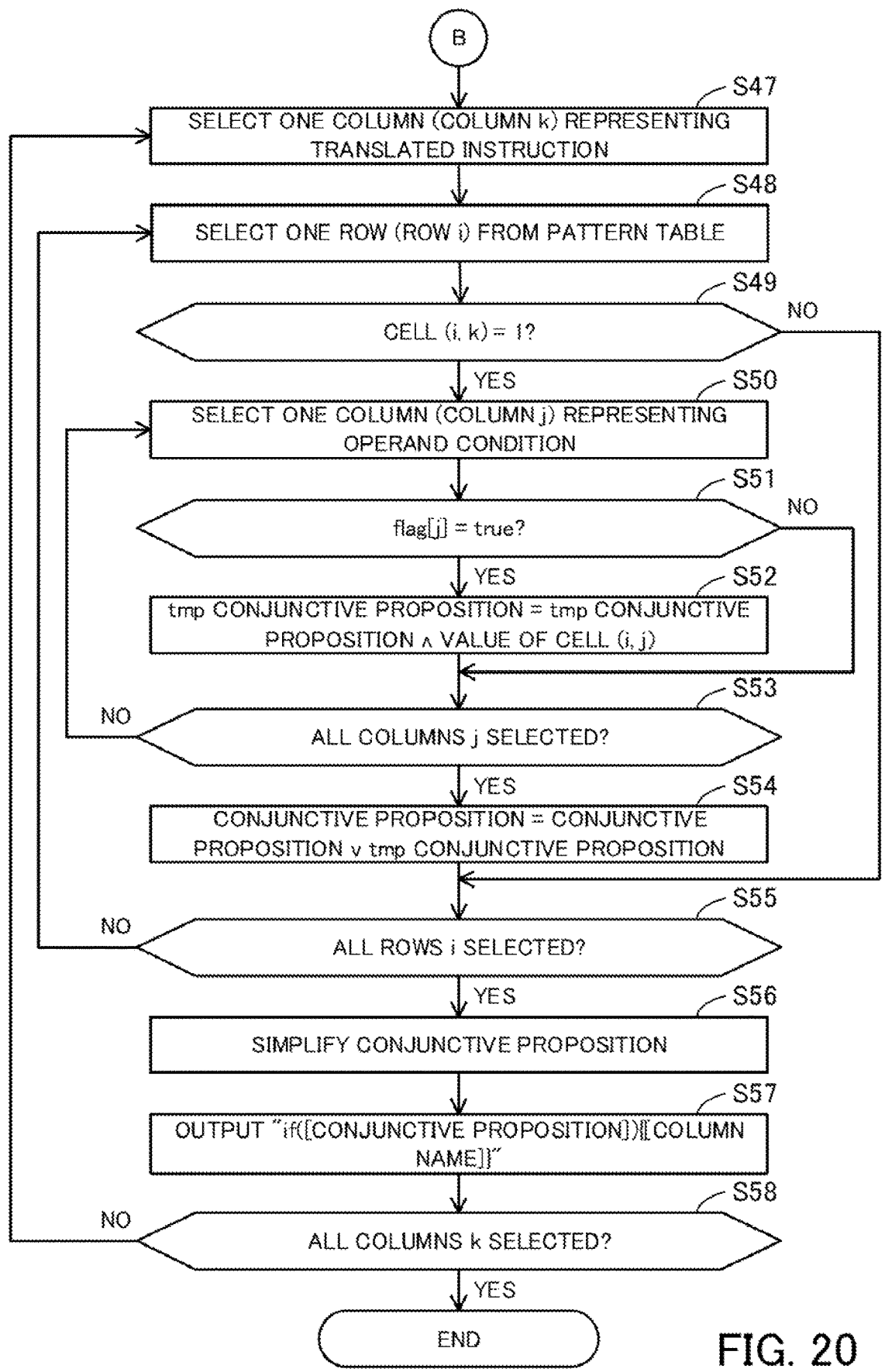
FIG. 20 is a flowchart illustrating the second exemplary procedure for the translation function generation, continuing from FIG. 19.

FIG. 20 is a flowchart illustrating the second exemplary procedure for the translation function generation, continuing from FIG. 19.

(Step S47) The translation function generating unit 125 selects one column representing a translated instruction from the pattern table. The column selected here is denoted by column k. The translation function generating unit 125 also defines a string variable called conjunctive proposition and then initializes the conjunctive proposition to blank.

(Step S48) The translation function generating unit 125 selects one row representing an operand pattern from the pattern table. The row selected here is denoted by row i. The translation function generating unit 125 also defines a string variable called tmp conjunctive proposition and then initializes the tmp conjunctive proposition to blank.

(Step S49) The translation function generating unit 125 determines whether the value of cell (i, k) in the pattern table is 1. The translation function generating unit 125 moves to step S50 if the value of cell (i, k) is 1, and moves to step S55 if cell (i, k) is blank.

(Step S50) The translation function generating unit 125 selects one column representing an operand condition from the pattern table. The column selected here is denoted by column j.

(Step S51) The translation function generating unit 125 determines whether flag[j] is true. The translation function generating unit 125 moves to step S52 if flag[j] is true, and moves to step S53 if flag[j] is false.

(Step S52) The translation function generating unit 125 extracts the value of cell (i, j) from the pattern table, and generates a new proposition which is a logical AND of the temp conjunctive proposition and the value of cell (i, j). The translation function generating unit 125 plugs the generated proposition into the temp conjunctive proposition.

(Step S53) The translation function generating unit 125 determines whether all columns each representing an operand condition have been selected in step S50. If all the columns representing operand conditions have been selected, the translation function generating unit 125 moves to step S54, and otherwise returns to step S50.

(Step S54) The translation function generating unit 125 generates a new proposition which is a logical OR of the conjunctive proposition and the temp conjunctive proposition. The translation function generating unit 125 plugs the generated proposition into the conjunctive proposition.

(Step S55) The translation function generating unit 125 determines whether all rows each representing an operand pattern have been selected in step S48. If all the rows representing operand patterns have been selected, the translation function generating unit 125 moves to step S56, and otherwise returns to step S48.

(Step S56) The translation function generating unit 125 simplifies the conjunctive proposition. The translation function generating unit 125 may use a formula manipulation library implementing a logical compression algorithm.

(Step S57) The translation function generating unit 125 extracts the column name written in the title row of column k from the pattern table. Then, the translation function generating unit 125 outputs a string of "if([conjunction proposition]){[column name]}".

(Step S58) The translation function generating unit 125 determines whether all columns each representing a translated instruction have been selected in step S47. If all the columns representing translated instructions have been selected, the translation function generating unit 125 ends the translation function generation, and otherwise returns to step S47.

Figure 21:
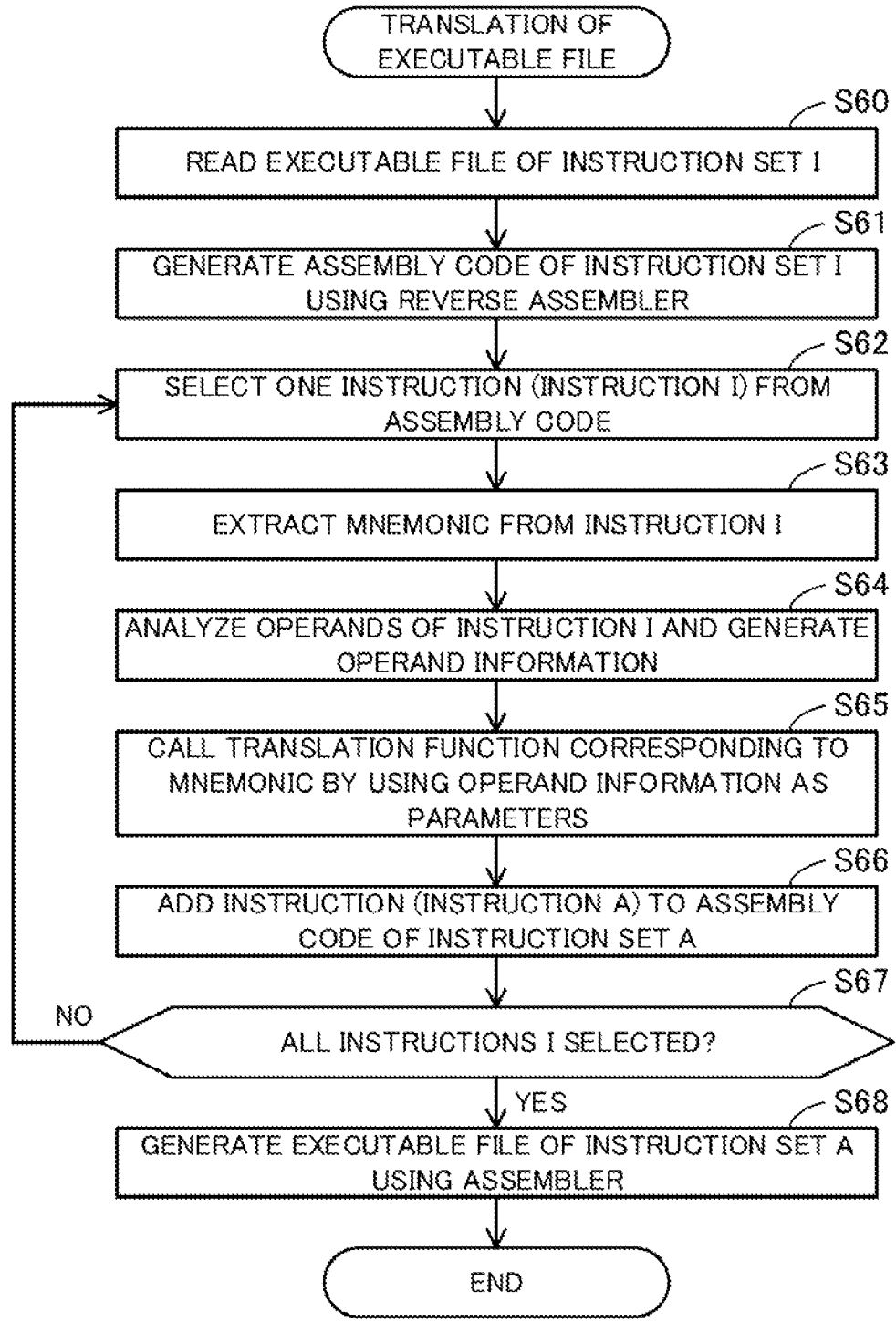
FIG. 21 is a flowchart illustrating an exemplary procedure for executable file translation.

FIG. 21 is a flowchart illustrating an exemplary procedure for executable file translation.

(Step S60) The executable file translating unit 126 reads the executable file of the instruction set I designated as a translation target from the executable file storing unit 123.

(Step S61) The executable file translating unit 126 uses a reverse assembler for the instruction set I to thereby generate assembly code of the instruction set I from the executable file of the instruction set I.

(Step S62) The executable file translating unit 126 selects one instruction from the assembly code generated in step S61. The instruction selected here is denoted by an instruction I.

(Step S63) The executable file translating unit 126 extracts a mnemonic from the instruction I. The mnemonic is a string representing an instruction type, such as add or sub.

(Step S64) The executable file translating unit 126 extracts operands from the instruction I and analyzes them. The operands are strings following the mnemonic. The executable file translating unit 126 generates operand information on characteristics of the operands, such as the number of operands and the data length.

(Step S65) The executable file translating unit 126 designates the operand information generated in step S64 as parameters and calls a translation function corresponding to the mnemonic extracted in step S63. The executable file translating unit 126 acquires an instruction of the instruction set A as a return value of the translation function. The instruction acquired here is denoted by an instruction A. Note that the instruction A acquired here may be composed of only one instruction or two or more instructions.

(Step S66) The executable file translating unit 126 adds the instruction A acquired in step S65 to the end of assembly code of the translated instruction set A.

(Step S67) The executable file translating unit 126 determines whether all instructions each included in the assembly code of the instruction set I have been selected in step S62. If all the instructions have been selected, the executable file translating unit 126 moves to step S68, and otherwise returns to step S62.

(Step S68) The executable file translating unit 126 generates an executable file of the instruction set A from the assembly code of the instruction set A using the assembler designed for the instruction set A. The executable file translating unit 126 stores the executable file of the instruction set A in the executable file storing unit 123.

According to the information processor 100 of the second embodiment, an executable file designed for a processor having the instruction set I is translated into an executable file for a processor having the instruction set A. Therefore, even if source code of an already existing program is not available, the existing program is made reusable in different computation environments. In addition, a translation program for translating assembly code is automatically generated from pattern tables created by the developer. Therefore, the implementation burden on the developer is reduced compared to the case where the developer manually implements the translation program. Further, there is a reduced risk of introducing errors into the translation program resulting from operational errors.

Especially, there is a complexity about translation from a CISC instruction set into a RISC instruction set because one pre-translation instruction is translated into different sets of instructions according to operand types. In this regard, the auto-generation of the translation program reduces the implementation burden on the developer. In addition, each pattern table includes rows corresponding to operand patterns and columns corresponding to translated instructions, and has a user interface including entry cells for flags at the intersections of the rows and the columns. Further, multiple columns corresponding to multiple translated instructions are arranged sequentially from left to right in the order of execution. Therefore, the developer is able to efficiently define the specifications of the translation function simply by entering flags, such as "1's", in the pattern table.

When the translation source instruction set is expanded, the developer is able to modify the translation program by adding rows for newly created operand patterns to a corresponding pattern table. Therefore, the work burden on the developer is reduced compared to the case where the developer manually modifies the translation program. In addition, new entries to the rows corresponding to the new operand patterns have no influence on specifications of the translation function, related to already existing operand patterns. Therefore, there is a reduced risk of causing errors in the translation program associated with the modification. In addition, the developer is able to build the pattern table progressively, starting with operand patterns whose specifications have been established.

In addition, by the use of a function for previewing the pattern table, the developer is able to edit the pattern table while checking in real time the source code of the translation program being produced. Herewith, the work efficiency of the developer is improved. Further, adoption of the column-major order and simplification of the condition determination statements allow the translation program to be efficient and reduced in size.

(c) Third Embodiment

Next described is a third embodiment. While omitting repeated explanations, the following description focuses on differences from the second embodiment above.

A translation destination instruction set A may include single instruction multiple data (SIMD) instructions whose operands specify data items with different data lengths for different CPUs. SIMD instructions are a class of parallel computing instructions that simultaneously perform the same operation, such as additions, on multiple unit data blocks. The data lengths of operands in SIMD instructions may also be referred to as vector lengths.

The vector length supported by a given CPU is determined by the size of SIMD registers which store data for SIMD instructions. On the other hand, the instruction set A may be used by CPUs for various purposes, such as CPUs for embedded devices and those for server devices. In view of this, the instruction set A allows CPU implementers to choose the vector length for a given SIMD instruction. Such SIMD instructions may be called CPU- or implementation-dependent SIMD instructions.

For example, the instruction set A allows for no support for CPU-dependent SIMD instructions. In addition, the instruction set A allows for selection of the vector length of such a CPU-dependent SIMD instruction amongst the followings: 128, 256, 384, 512, 640, 768, 896, 1024, 1152, 1280, 1408, 1536, 1664, 1792, 1920, and 2048 bits. The third embodiment describes below how to make CPU implementation with four exemplary patterns: no support; 128 bits; 256 bits; and 512 bits.

In the case of using CPU-dependent SIMD instructions in translated assembly code, one conceivable approach is for an information processor to perform the method of the second embodiment while regarding that CPUs supporting different vector lengths have different instruction sets. In this case, for each vector length, the information processor creates a pattern table and generates a translation program. The information processor also receives a specification of the vector length supported by a translation destination CPU and generates an assembly code of the instruction set A using the translation program corresponding to the specified vector length.

However, assembly codes of the instruction set A which differ only in the vector length resemble each other, and pattern tables and translation programs used to generate such assembly codes are also similar to each other. Therefore, creation of a pattern table for each vector length is inefficient, and the burden of creating and maintaining the pattern tables is significant. In view of this, the third embodiment is directed to covering multiple CPUs supporting different vector lengths with a single pattern table. In addition, an information processor according to the third embodiment generates, based on the pattern table, a translation program that covers the multiple CPUs supporting different vector lengths.

The information processor of the third embodiment is implemented with the same modular structure as that of the information processor 100 according to the second embodiment, illustrated in FIGS. 2 and 16. Therefore, in the third embodiment below, like components to those of the information processor 100 are denoted by like reference numerals in FIGS. 2 and 16.

Figure 22:
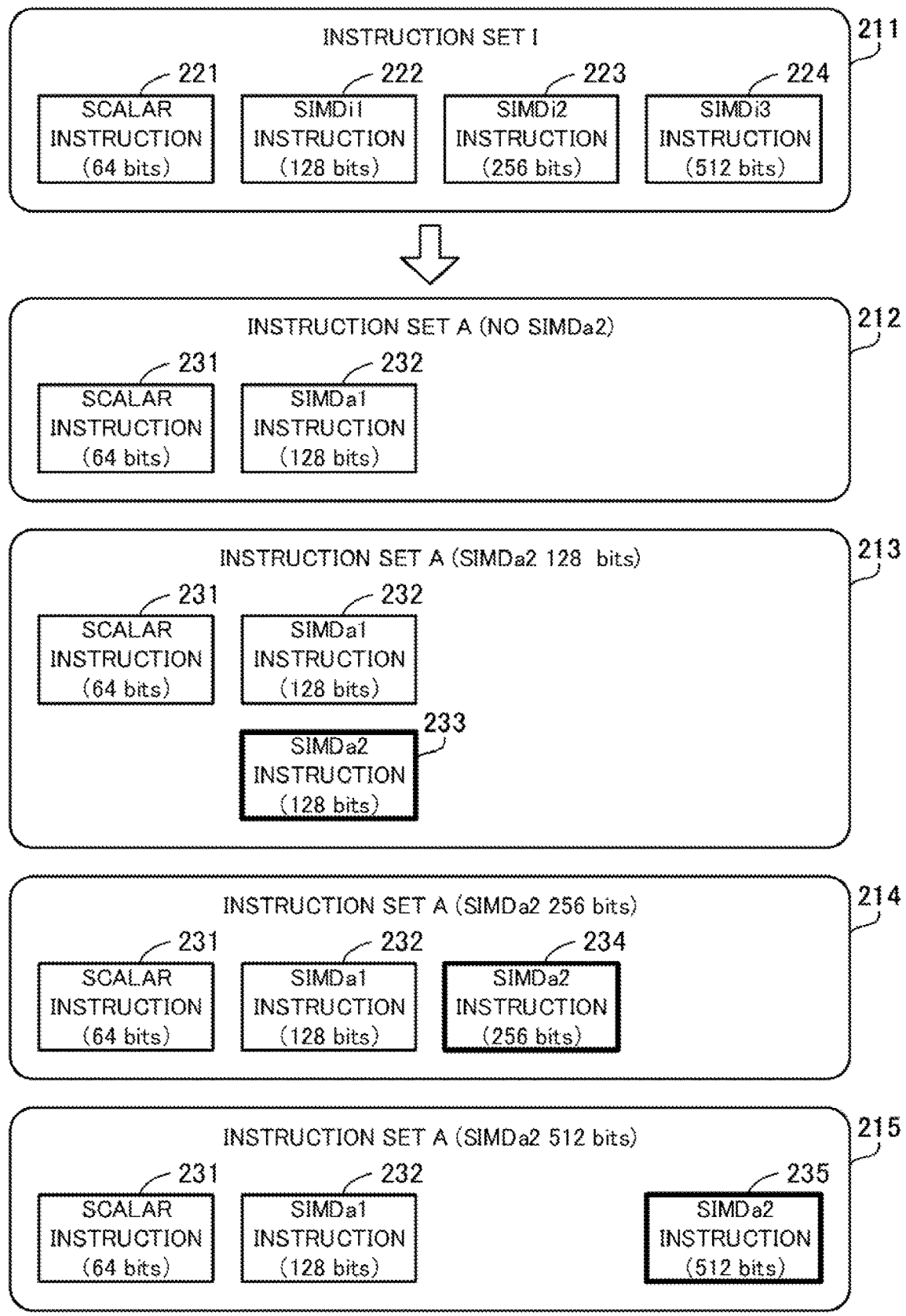
FIG. 22 illustrates exemplary instruction sets with different vector lengths.

FIG. 22 illustrates exemplary instruction sets with different vector lengths.

An instruction set I 211 is an instruction set held by a translation source CPU. The instruction set I 211 does not include CPU-dependent SIMD instructions. Instruction sets A 212 to 215 are instruction sets used on translation destination CPU candidates. The instruction sets A 212 to 215 correspond to a plurality of CPUs supporting different vector lengths. The instruction set A 212 does not include CPU-dependent SIMD instructions. The instruction sets A 213 to 215 include CPU-dependent SIMD instructions. The instruction set A 213 corresponds to 128-bit vector length. The instruction set A 214 corresponds to 256-bit vector length. The instruction set A 215 corresponds to 512-bit vector length.

The instruction set I 211 includes a scalar instruction 221, a SIMDi1 instruction 222, a SIMDi2 instruction 223, and a SIMDi3 instruction 224. The scalar instruction 221 is a simple instruction specifying an operation, such as an addition, subtraction, or multiplication, on a 64-bit unit data block. The SIMDi1 instruction 222 is a parallel computing instruction specifying an operation on two 64-bit unit data blocks, i.e., 128-bit data. The SIMDi2 instruction 223 is a parallel computing instruction specifying an operation on four 64-bit unit data blocks, i.e., 256-bit data. The SIMDi3 instruction 224 is a parallel computing instruction specifying an operation on eight 64-bit unit data blocks, i.e., 512-bit data. The data lengths of the SIMDi1 instruction 222, the SIMDi2 instruction 223, and the SIMDi3 instruction 224 are fixed, irrespective of CPUs.

The instruction set A 212 includes a scalar instruction 231 and a SIMDa1 instruction 232. The scalar instruction 231 is a simple instruction specifying an operation on one 64-bit unit data block. The SIMDa1 instruction 232 is a parallel computing instruction specifying an operation on two 64-bit unit data blocks, i.e., 128-bit data. The data length of the SIMDa1 instruction 232 is fixed, irrespective of CPUs. CPUs supporting the instruction set A 212 include SIMD registers of 128 bits.

The instruction set A 213 includes the scalar instruction 231, the SIMDa1 instruction 232, and a SIMDa2 instruction 233. The SIMDa2 instruction 233 is a parallel computing instruction specifying an operation on two 64-bit unit data blocks, i.e., 128-bit data. CPUs supporting the instruction set A 213 include SIMD registers of 128 bits.

The instruction set A 214 includes the scalar instruction 231, the SIMDa1 instruction 232, and a SIMDa2 instruction 234. The SIMDa2 instruction 234 is a parallel computing instruction specifying an operation on four 64-bit unit data blocks, i.e., 256-bit data. CPUs supporting the instruction set A 214 include SIMD registers of 256 bits.

The instruction set A 215 includes the scalar instruction 231, the SIMDa1 instruction 232, and a SIMDa2 instruction 235. The SIMDa2 instruction 235 is a parallel computing instruction specifying an operation on eight 64-bit unit data blocks, i.e., 512-bit data. CPUs supporting the instruction set A 215 include SIMD registers of 512 bits. The SIMDa2 instructions 233, 234, and 235 correspond to CPU-dependent instructions whose vector lengths change for different CPUs.

The information processor 100 translates assembly code of the instruction set I 211 into assembly code of one of the instruction sets A 212 to 215. In translation of the instruction set I 211 into the instruction set A 212, the information processor 100 translates the scalar instruction 221 into the scalar instruction 231 and the SIMDi1 instruction 222 into the SIMDa1 instruction 232. The SIMDi2 instruction 223 and the SIMDi3 instruction 224 are excluded from translation because the size of the SIMD registers is insufficient.

Similarly, in translation of the instruction set I 211 into the instruction set A 213, the information processor 100 translates the scalar instruction 221 into the scalar instruction 231 and the SIMDi1 instruction 222 into the SIMDa1 instruction 232. The SIMDi2 instruction 223 and the SIMDi3 instruction 224 are excluded from translation because the size of the SIMD registers is insufficient.

In translation of the instruction set 1211 into the instruction set A 214, the information processor 100 translates the scalar instruction 221 into the scalar instruction 231, the SIMDi1 instruction 222 into the SIMDa1 instruction 232, and the SIMDi2 instruction 223 into the SIMDa2 instruction 234. The SIMDi3 instruction 224 is excluded from translation because the size of the SIMD registers is insufficient.

In translation of the instruction set I 211 into the instruction set A 215, the information processor 100 translates the scalar instruction 221 into the scalar instruction 231 and the SIMDi1 instruction 222 into the SIMDa1 instruction 232. The information processor 100 also translates the SIMDi2 instruction 223 and the SIMDi3 instruction 224 into the SIMDa2 instruction 235.

Since the instruction set A 215 includes no 256-bit SIMD instructions, a 256-bit operation is executed using a 512-bit SIMD instruction. At this time, of the 512-bit SIMD register, only the low-order 256 bits of the bit operation result bear meaning while the high-order 256 bits of the operation result have no meaning. Hence, in order to secure operational comparability, supplementary processing is performed to discard the high-order 256 bits of the operation result (by, for example, replacing the high-order 256 bits with zeros).

Figure 23:
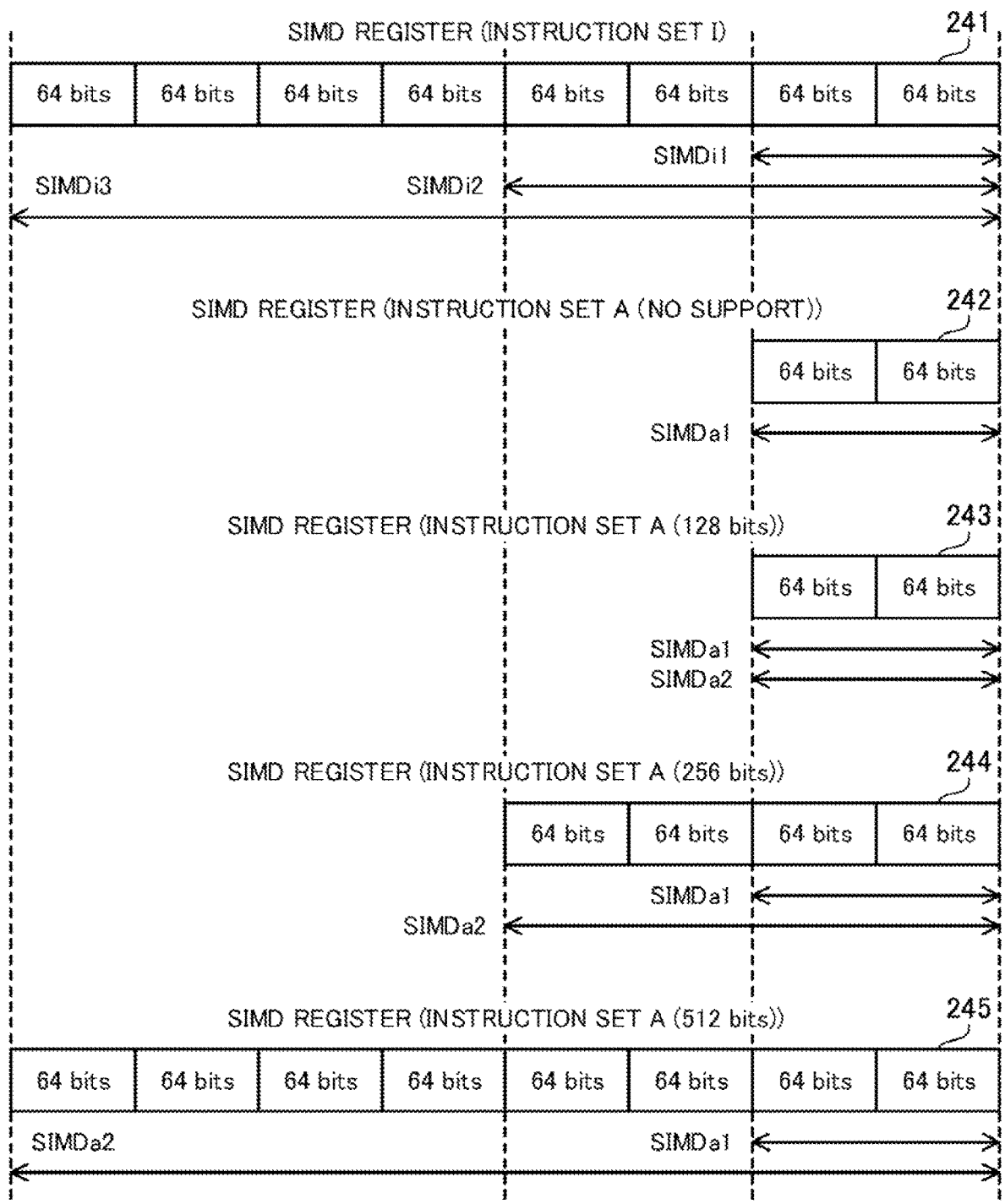
FIG. 23 illustrates an example of usage of SIMD registers.

FIG. 23 illustrates an example of usage of SIMD registers.

SIMD registers 241 are included in CPUs supporting the instruction set I 211. The SIMD registers 241 are 512 bit wide, and hold eight 64-bit unit data blocks. The SIMD registers 241 are used in common by the SIMDi1 instruction 222, the SIMDi2 instruction 223, and the SIMDi3 instruction 224. Note that the scalar instruction 221 uses a normal 64-bit register.

The SIMDi1 instruction 222 uses the low-order 128 bits of the SIMD register 241. At this time, the high-order 384 bits are automatically controlled to be invalid. The SIMDi2 instruction 223 uses the low-order 256 bits of the SIMD register 241. At this time, the high-order 256 bits are automatically controlled to be invalid. The SIMDi3 instruction 224 uses the entire 512 bits of the SIMD register 241.

SIMD registers 242 are included in CPUs supporting the instruction set A 212. The SIMD registers 242 are 128 bit wide, and hold two 64-bit unit data blocks. The SIMDa1 instruction 232 uses the entire 128 bits of the SIMD register 242. Note that the scalar instruction 231 uses a normal 64-bit register.

The SIMD registers 243 are included in CPUs supporting the instruction set A 213. The SIMD registers 243 are 128 bit wide, and hold two 64-bit unit data blocks. The SIMD registers 243 are used in common by the SIMDa1 instruction 232 and the SIMDa2 instruction 233. The SIMDa1 instruction 232 and the SIMDa2 instruction 233 use the entire 128 bits of the SIMD registers 243.

The SIMD registers 244 are included in CPUs supporting the instruction set A 214. The SIMD registers 244 are 256 bit wide, and hold four 64-bit unit data blocks. The SIMD registers 244 are used in common by the SIMDa1 instruction 232 and the SIMDa2 instruction 234. The SIMDa1 instruction 232 uses the low-order 128 bits of the SIMD register 244. At this time, the high-order 128 bits are automatically controlled to be invalid. The SIMDa2 instruction 234 uses the entire 256 bits of the SIMD register 244.

The SIMD registers 245 are included in CPUs supporting the instruction set A 215. The SIMD registers 245 are 512 bit wide, and hold eight 64-bit unit data blocks. The SIMD registers 245 are used in common by the SIMDa1 instruction 232 and the SIMDa2 instruction 235. The SIMDa1 instruction 232 uses the low-order 128 bits of the SIMD register 245. At this time, the high-order 384 bits are automatically controlled to be invalid. The SIMDa2 instruction 235 uses the entire 512 bits of the SIMD register 245.

When the SIMDi2 instruction 223 is translated into the SIMDa2 instruction 235, the high-order 256 bits of the SIMD register 245 are not automatically invalidated. Hence, the information processor 100 generates assembly code that assigns zeros to the high-order 256 bits of the SIMD register 245. Note that, for the remaining translation patterns depicted in FIG. 22, zero assignment to the high-order bits is not needed because there is no change in the vector length between the instructions before and after translation.

FIG. 24 illustrates an example of translation into instruction sets with different vector lengths.

A table 251 depicts assembly codes of the instruction sets A 212 to 215, equivalent to a vaddps instruction of the instruction set I 211. The vaddps instruction is a SIMD instruction to execute addition operations in parallel. The vaddps instruction places the sum of the second and third operands in the first operand. Operand patterns of the vaddps instruction are classified into six patterns based on the vector length and whether or not the third operand is a memory address.

If the vaddps instruction has a vector length of 128 bits and the third operand being operation target data, it corresponds to the SIMDi1 instruction 222. An equivalent assembly code of the instruction set A 215 performs addition of 128 bits using the SIMDa1 instruction 232. The same goes for assembly codes of the instruction sets A 212 to 214.

If the vaddps instruction has a vector length of 128 bits and the third operand being a memory address, it corresponds to the SIMDi1 instruction 222. An equivalent assembly code of the instruction set A 215 saves, in stack area, data of 64 bytes (512 bits) of a given SIND register and loads data indicated by the memory address from memory into the SIMD register. The assembly code then performs addition of 128 bits using the SIMDa1 instruction 232 and returns the saved data from the stack area to the SIMD register.

An equivalent assembly code of the instruction set A 214 does basically the same as that of the instruction set A 215. Note however that data saved in the stack area is 32 bytes long (256 bits). Equivalent assembly codes of the instruction sets A 212 and 213 also do basically the same as that of the instruction set A 215. Note however that data saved in the stack area is 16 bytes long (128 bits).

If the vaddps instruction has a vector length of 256 bits and the third operand being operation target data, it corresponds to the SIMDi2 instruction 223. An equivalent assembly code of the instruction set A 215 performs addition of 512 bits using the SIMDa2 instruction 235, and then assigns zeros to the high-order 256 bits of a SIMD register used to store the result of the addition. An equivalent assembly code of the instruction set A 214 performs addition of 256 bits using the SIMDa2 instruction 234. In this case, zero assignment to a SIMD register used to store the result of the addition is not needed.

If the vaddps instruction has a vector length of 256 bits and the third operand being a memory address, it corresponds to the SIMDi2 instruction 223. An equivalent assembly code of the instruction set A 215 saves, in stack area, data of 64 bytes of a given SIMD register and loads data indicated by the memory address from memory into the SIMD register. The assembly code then performs addition of 512 bits using the SIMDa2 instruction 235, assigns zeros to the high-order 256 bits of a SIMD register used to store the result of the addition, and returns the saved data from the stack area to the SIMD register. An equivalent assembly code of the instruction set A 214 differs from that of the instructions set A 215 in that data saved in the stack area is 32 bytes long and no zero assignment to the SIMD register is needed.

If the vaddps instruction has a vector length of 512 bits and the third operand being operation target data, it corresponds to the SIMDi3 instruction 224. An equivalent assembly code of the instruction set A 215 performs addition of 512 bits using the SIMDa2 instruction 235.

if the vaddps instruction has a vector length of 512 bits and the third operand being a memory address, it corresponds to the SIMDi3 instruction 224. An equivalent assembly code of the instruction set A 215 saves, in stack area, data of 64 bytes of a given SIMD register and loads data indicated by the memory address from memory into the SIMD register. The assembly code then performs addition of 512 bits using the SIMDa2 instruction 235 and returns the saved data from the stack area to the SIMD register.

As described above, assembly codes for CPUs supporting different vector lengths may be similar to each other but not identical. Therefore, the information processor 100 extends the pattern table described in the second embodiment and represents influence of the difference in the vector length.

FIG. 25 illustrates a first modification of the pattern table.

As with the pattern table 144 of the second embodiment, a pattern table 252 includes a plurality of rows corresponding to a plurality of operand patterns. The pattern table 252 also includes a column for the operand patterns and a plurality of columns corresponding to a plurality of instructions of the instruction sets A. Column names in the columns corresponding to the instructions of the instruction sets A include statements for outputting instructions of the instruction sets A in a translation function program.

Further, the pattern table 252 of the third embodiment has, between the row for the column names and the rows corresponding to the operand patterns, rows for CPU dependence information representing mappings between vector lengths and the instructions of the instruction sets A. As the rows for the CPU dependence information, the pattern table 252 includes four rows each corresponding to no support, 128 bits, 256 bits, and 512 bits. The CPU dependence information includes flags each indicating whether a corresponding one of the instructions of the instruction sets A is valid for a corresponding vector length. For example, the flag has a value of "1" if the corresponding instruction is valid, and the flag is left blank if it is invalid.

When the translation function program is used, the vector length supported by a translation destination CPU is specified by the user. Each instruction valid for the specified vector length is output if "1" is found in a row corresponding to a given operand pattern. On the other hand, each instruction invalid for the specified vector length is not output even if "1" is found in a row corresponding to a given operand pattern. Thus, the CPU dependence information functions as a filter for the instructions of the instruction sets A. Herewith, it is possible to output instructions to be used by a CPU supporting a specific vector length.

FIG. 26 illustrates the first modification of the pattern table, continuing from FIG. 25.

As with the pattern table 144 of the second embodiment, the pattern table 252 includes a column for previews of source codes of the translation function program. Each statement for outputting an instruction valid for all the vector lengths is directly inserted to a source code. On the other hand, each statement for outputting an instruction valid only for some vector lengths is given a conditional branch statement for determining the vector length and then inserted to a source code.

An instruction in the second column from the last of the pattern table 252 is valid only for CPUs supporting a vector length of 512 bits amongst no support, 128 bits, 256 bits, and 512 bits. In addition, this instruction is used for the third and fourth operand patterns. Therefore, a source code corresponding to the third operand pattern includes a statement for determining if the specified vector length is 512 bits and outputting the above instruction in the case of 512 bits. Similarly, a source code corresponding to the fourth operand pattern includes a statement for determining if the specified vector length is 512 bits and outputting the above instruction in the case of 512 bits.

Figure 27:
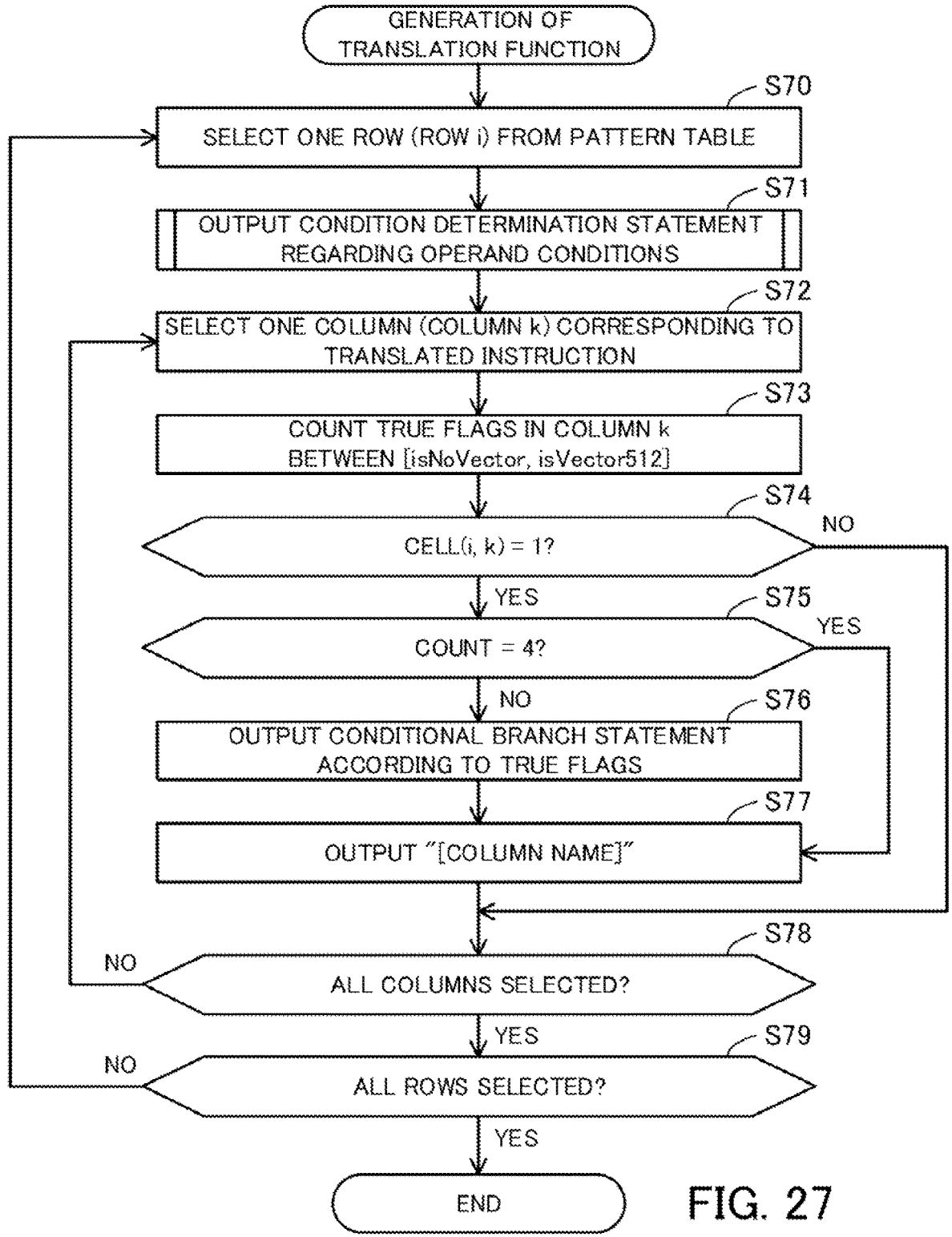
FIG. 27 is a flowchart illustrating a third exemplary procedure for the translation function generation.

FIG. 27 is a flowchart illustrating a third exemplary procedure for the translation function generation.

The generation of a translation function described below uses the row-major order. Note that the column-major order described in the second embodiment may be employed instead to generate the translation function.

(Step S70) The translation function generating unit 125 selects one row corresponding to an operand pattern from the pattern table 252. The row selected here is denoted by row i (i is an integer greater than or equal to 1).

(Step S71) The translation function generating unit 125 outputs a condition determination statement for determining operand conditions in a manner similar to steps S11 to S15 of FIG. 17.

(Step S72) The translation function generating unit 125 selects one column corresponding to a translated instruction from the pattern table 252. The column selected here is denoted by column k (k is an integer greater than or equal to 1).

(Step S73) The translation function generating unit 125 counts the number of flags set to true (flags with a value of 1) in column k, between isNoVector and isVector512. The minimum counting value is 0 and the maximum counting value is 4.

(Step S74) The translation function generating unit 125 determines whether the value of cell (i, k) in the pattern table 252 is 1. if the value of cell (i, k) is 1, the translation function generating unit 125 moves to step S75; otherwise moves to step S78.

(Step S75) The translation function generating unit 125 determines if the number counted in step S73 is 4. When the counted number is 4, that is, the selected instruction is valid for all the vector lengths, the translation function generating unit 125 moves to step S77. When the counted number is not 4, that is, the selected instruction is invalid for some of the vector lengths, the translation function generating unit 125 moves to step S76.

(Step S76) The translation function generating unit 125 outputs a conditional branch statement according to a flag or flags set to true. The determination condition of this condition branch statement is a logical expression in which, amongst isNoVector, isVector128, isVector256, and isVector512, those with flags equal to 1 are combined by a logical OR. For example, if the flags of isNoVector and isVector128 are set to 1, the determination condition is: isNoVector II isVector128.

(Step S77) The translation function generating unit 125 extracts the column name of column k from the pattern table 252. The translation function generating unit 125 outputs the extracted column name.

(Step S78) The translation function generating unit 125 determines whether all columns each corresponding to a translated instruction have been selected in step S72. If all the columns have been selected, the translation function generating unit 125 moves to step S79, and otherwise returns to step S72.

(Step S79) The translation function generating unit 125 determines whether all rows each corresponding to an operand pattern have been selected in step S70. If all the rows have been selected, the translation function generating unit 125 ends the translation function generation, and otherwise returns to step S70.

The executable file translation may be implemented by the same procedure as depicted in the flowchart of FIG. 21 according to the second embodiment. Note however that in the executable file translation of the third embodiment, the information processor 100 receives a specification of the vector length supported by a target CPU from the user. The information processor 100 specifies the vector length when calling a translation function.

The information processor 100 of the third embodiment achieves the same effect as the second embodiment. In addition, the information processor 100 uses SIMD instructions whose vector lengths change for different CPUs to generate assembly code or machine language code of the instruction sets A. Therefore, the information processor 100 is able to cover various CPUs supporting the instruction sets A.

Further, the information processor 100 uses a single pattern table to define translation rules for a plurality of vector lengths. Therefore, this reduces the workload of developers of translation programs in not only creating but also maintaining the pattern table compared to the case of creating a pattern table for each vector length.

In addition, the pattern table of the third embodiment includes flags for filtering translated instructions to be used according to the vector length. This allows the developers to succinctly describe the translation rules for different vector lengths.

(d) Fourth Embodiment

Next described is a fourth embodiment. While omitting repeated explanations, the following description focuses on differences from the third embodiment above.

An information processor of the fourth embodiment supports SIMD instructions of the instruction sets A with different vector lengths for different CPUs, as with the third embodiment. Note however that the fourth embodiment differs from the third embodiment in the structure of the pattern table.

The information processor of the fourth embodiment has the same module structure as that of the information processor 100 of the second embodiment, depicted in FIGS. 2 and 16. Hence, the fourth embodiment below is described using the same reference numerals as those used in FIGS. 2 and 16.

FIG. 28 illustrates a second modification of the pattern table.

As with the pattern table 144 of the second embodiment, a pattern table 253 includes a plurality of rows corresponding to a plurality of operand patterns. The pattern table 253 also includes a column for the operand patterns and a plurality of columns corresponding to a plurality of instructions of the instruction sets A. Column names in the columns corresponding to the instructions of the instruction sets A include statements for outputting instructions of the instruction sets A in a translation function program.

Some of the statements corresponding to the column names call library functions that output different instructions for different vector lengths. The first, eighth, and ninth translated instructions in the pattern table 253 are dependent on the vector length. Therefore, a function XT_PUSH_ZREG included in the first statement, a function MOV_FOR_512 included in the eighth statement, and a function XT_POP_ZREG included in the ninth statement are vector length-dependent library functions.

FIG. 29 illustrates the second modification of the pattern table, continuing from FIG. 28.

As with the pattern table 144 of the second embodiment, the pattern table 253 includes a column for previews of source codes of the translation function program. The information processor 100 enumerates, for each operand pattern, the column names of columns with flags equal to 1 sequentially from left to right and thus generates source codes of the translation function program. The source codes include calls to library functions that output different instructions for different vector lengths.

The second operand pattern in the pattern table 253 uses the first and ninth translated instructions. Therefore, the source code of the second operand pattern includes calls to the functions XT_PUSH_ZREG and XT_POP_ZREG. The third operand pattern uses the eighth translated instruction. Therefore, the source code of the third operand pattern includes a call to the function MOV_FOR_512.

The fourth operand pattern uses the first, eighth, and ninth translated instructions. Therefore, the source code of the fourth operand pattern includes calls to the functions XT_PUSH_ZREG, MOV_FOR_512, and XT_POP_ZREG. The sixth operand pattern uses the first and ninth translated instructions. Therefore, the source code of the sixth operand pattern includes calls to the functions XT_PUSH_ZREG and XT_POP_ZREG.

FIG. 30 illustrates exemplary library functions of the translation function program.

A translation function program 254 includes, as library functions, the functions XT_PUSH_ZREG, XT_POP_ZREG, and MOV_FOR_512. The function XT_PUSH_ZREG acquires a register number of a SIMD register to be used and calculates the byte count of the vector length. This function generates a store instruction for saving data of 128 bits when the vector length specification is "no support" or "128 bits", and otherwise generates a store instruction for saving the entire data of the SIMD register.

The function XT_POP_ZREG generates a load instruction for reading data of 128 bits when the vector length specification is "no support" or "128 bits", and otherwise generates a load instruction for reading the entire data of the SIMD register. The function MOV_FOR_512 generates an assignment instruction for assigning zeros to the high-order 256 bits of the SIMD register when the vector length specification is "512 bits", and otherwise outputs no instruction.

Thus, library functions that output different instructions for different vector lengths are prepared in advance, and differences in translated instructions resulting directly from the difference in the vector length are absorbed by the library functions. Developers of translation programs simply set each flag in a column indicating a call to a library function to 1, and are thus able to describe translation specifications, regardless of influence of the vector length.

The translation function generation may be implemented by the same procedure as depicted in the flowcharts of FIGS. 17 to 20 according to the second embodiment. In addition, the executable file translation may be implemented by the same procedure as depicted in the flowchart of FIG. 21 according to the second embodiment. Note however that in the executable file translation of the fourth embodiment, the information processor 100 receives a specification of the vector length supported by a target CPU from the user and specifies the vector length when calling a translation function.

The information processor 100 of the fourth embodiment achieves the same effect as the second embodiment. In addition, the information processor 100 uses SIMD instructions whose vector lengths change for different CPUs to generate assembly code or machine language code of the instruction sets A. Therefore, the information processor 100 is able to cover various CPUs supporting the instruction sets A.

Further, the information processor 100 uses a single pattern table to define translation rules for a plurality of vector lengths. Therefore, this reduces the workload of developers of translation programs in not only creating but also maintaining the pattern table compared to the case of creating a pattern table for each vector length.

In addition, the pattern table of the fourth embodiment encapsulates influence of difference of vector lengths into library functions for outputting translated instructions. Therefore, once the developers identify the influence of vector lengths at the translated instruction level and then define the library functions, they are able to abstractly describe translation rules of various vector lengths using the library functions. This allows the developers to succinctly describe translation rules for different vector lengths.

According to an aspect, it is possible to reduce the implementation burden of a translation program used to translate instructions between different instruction sets.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:

receiving a table data set that represents mappings between a plurality of operand patterns indicating types of operands possibly included in a first instruction used in a first assembly language and a plurality of second instructions used in a second assembly language or a machine language corresponding to the second assembly language, the table data set mapping two or more of the plurality of second instructions to each of the plurality of operand patterns; and generating, based on the table data set, a translation program used to translate first code written in the first assembly language into second code written in the second assembly language or the machine language, the translation program defining a process of determining an operand pattern of an instruction included in the first code and outputting two or more instructions of the second code according to the determined operand pattern, the plurality of second instructions includes a parallel computing instruction that operates on data items to be processed in parallel, whose maximum data length differs for different processors, the table data set further includes processor dependence information representing mappings between a plurality of maximum data lengths and the plurality of second instructions, and the generating of the translation program includes generating the translation program based on the processor dependence information such that the two or more of the plurality of second instructions mapped to the determined operand pattern are narrowed down according to a maximum data length specified amongst the plurality of maximum data lengths.

2. The non-transitory computer-readable recording medium according to claim 1, wherein:

the table data set is data in a form of a matrix including a plurality of rows representing the plurality of operand patterns and a plurality of columns representing the plurality of second instructions, and in the table data set, a flag is placed at an intersection of one row corresponding to one operand pattern and one column corresponding to one second instruction, the flag indicating whether the one second instruction is used to translate the first instruction having the one operand pattern.

3. The non-transitory computer-readable recording medium according to claim 2, wherein:

in the table data set, two or more flags are placed in the one row, each of which indicates that a corresponding second instruction is used to translate the first instruction having the one operand pattern, and the translation program is generated such that second instructions corresponding to two or more columns in which the two or more flags are placed are output sequentially column-wise from left to right across the table data set.

4. The non-transitory computer-readable recording medium according to claim 2, wherein:
the translation program includes a plurality of program blocks corresponding to the plurality of operand patterns, and each of the plurality of program blocks defines a process of outputting the two or more of the plurality of second instructions responsive to satisfaction of a specific condition, and
the generating of the translation program includes determining the specific condition of each of the plurality of program blocks by scanning flags placed in each of the plurality of rows.

5. The non-transitory computer-readable recording medium according to claim 2, wherein:
the translation program includes a plurality of program blocks corresponding to the plurality of second instructions, and each of the plurality of program blocks defines a process of outputting a second instruction corresponding to the program block responsive to satisfaction of a specific condition, and
the generating of the translation program includes determining the specific condition of each of the plurality of program blocks by scanning flags placed in each of the plurality of columns.

6. The non-transitory computer-readable recording medium according to claim 1, wherein:
the plurality of operand patterns differs in at least one of counts of the operands, types of memory areas designated by the operands, and data lengths of the operands.

7. The non-transitory computer-readable recording medium according to claim 1, wherein:
the receiving of the table data set includes receiving a plurality of table data sets corresponding to a plurality of first instructions used in the first assembly language, and
the generating of the translation program includes generating, based on the plurality of table data sets, the translation program including a plurality of translation functions corresponding to the plurality of first instructions.

8. The non-transitory computer-readable recording medium according to claim 1, wherein:
the process further includes receiving the first code and running the generated translation program to translate the first code into the second code.

9. An instruction translation support method comprising:
receiving, by a processor, a table data set that represents mappings between a plurality of operand patterns indicating types of operands possibly included in a first instruction used in a first assembly language and a plurality of second instructions used in a second assembly language or a machine language corresponding to the second assembly language, the table data set mapping two or more of the plurality of second instructions to each of the plurality of operand patterns; and
generating, by the processor, based on the table data set, a translation program used to translate first code written in the first assembly language into second code written in the second assembly language or the machine language, the translation program defining a process of determining an operand pattern of an instruction included in the first code and outputting two or more instructions of the second code according to the determined operand pattern,
the plurality of second instructions includes a parallel computing instruction that operates on data items to be processed in parallel, whose maximum data length differs for different processors,
the table data set further includes processor dependence information representing mappings between a plurality of maximum data lengths and the plurality of second instructions, and
the generating of the translation program includes generating the translation program based on the processor dependence information such that the two or more of the plurality of second instructions mapped to the determined operand pattern are narrowed down according to a maximum data length specified amongst the plurality of maximum data lengths.

10. An information processing apparatus comprising:
a memory configured to store a table data set that represents mappings between a plurality of operand patterns indicating types of operands possibly included in a first instruction used in a first assembly language and a plurality of second instructions used in a second assembly language or a machine language corresponding to the second assembly language, the table data set mapping two or more of the plurality of second instructions to each of the plurality of operand patterns; and
a processor configured to execute a process including generating, based on the table data set, a translation program used to translate first code written in the first assembly language into second code written in the second assembly language or the machine language, the translation program defining a process of determining an operand pattern of an instruction included in the first code and outputting two or more instructions of the second code according to the determined operand pattern,
the plurality of second instructions includes a parallel computing instruction that operates on data items to be processed in parallel, whose maximum data length differs for different processors,
the table data set further includes processor dependence information representing mappings between a plurality of maximum data lengths and the plurality of second instructions, and
the generating of the translation program includes generating the translation program based on the processor dependence information such that the two or more of the plurality of second instructions mapped to the determined operand pattern are narrowed down according to a maximum data length specified amongst the plurality of maximum data lengths.

11. A non-transitory computer-readable recording medium storing therein a computer program that causes a computer to execute a process comprising:
receiving a table data set that represents mappings between a plurality of operand patterns indicating types of operands possibly included in a first instruction used in a first assembly language and a plurality of second instructions used in a second assembly language or a machine language corresponding to the second assembly language, the table data set mapping two or more of the plurality of second instructions to each of the plurality of operand patterns; and
generating, based on the table data set, a translation program used to translate first code written in the first assembly language into second code written in the second assembly language or the machine language, the translation program defining a process of determining an operand pattern of an instruction included in the first code and outputting two or more instructions of the second code according to the determined operand pattern, the plurality of second instructions includes a parallel computing instruction that operates on data items to be processed in parallel, whose maximum data length differs for different processors, the translation program includes a library function that changes, according to a maximum data length specified amongst a plurality of maximum data lengths, an instruction to be output, and the table data set maps the library function to, amongst the plurality of operand patterns, an operand pattern whose method of translation into the second assembly language or the machine language is dependent on the specified maximum data length.

12. An instruction translation support method comprising:

receiving, by a processor, a table data set that represents mappings between a plurality of operand patterns indicating types of operands possibly included in a first instruction used in a first assembly language and a plurality of second instructions used in a second assembly language or a machine language corresponding to the second assembly language, the table data set mapping two or more of the plurality of second instructions to each of the plurality of operand patterns; and generating, by the processor, based on the table data set, a translation program used to translate first code written in the first assembly language into second code written in the second assembly language or the machine language, the translation program defining a process of determining an operand pattern of an instruction included in the first code and outputting two or more instructions of the second code according to the determined operand pattern, wherein:

the plurality of second instructions includes a parallel computing instruction that operates on data items to be processed in parallel, whose maximum data length differs for different processors, the translation program includes a library function that changes, according to a maximum data length specified amongst a plurality of maximum data lengths, an instruction to be output, and the table data set maps the library function to, amongst the plurality of operand patterns, an operand pattern whose method of translation into the second assembly language or the machine language is dependent on the specified maximum data length.

13. An information processing apparatus comprising:

a memory configured to store a table data set that represents mappings between a plurality of operand patterns indicating types of operands possibly included in a first instruction used in a first assembly language and a plurality of second instructions used in a second assembly language or a machine language corresponding to the second assembly language, the table data set mapping two or more of the plurality of second instructions to each of the plurality of operand patterns; and a processor configured to execute a process including generating, based on the table data set, a translation program used to translate first code written in the first assembly language into second code written in the second assembly language or the machine language, the translation program defining a process of determining an operand pattern of an instruction included in the first code and outputting two or more instructions of the second code according to the determined operand pattern, wherein:

the plurality of second instructions includes a parallel computing instruction that operates on data items to be processed in parallel, whose maximum data length differs for different processors, the translation program includes a library function that changes, according to a maximum data length specified amongst a plurality of maximum data lengths, an instruction to be output, and the table data set maps the library function to, amongst the plurality of operand patterns, an operand pattern whose method of translation into the second assembly language or the machine language is dependent on the specified maximum data length.

* * * * *